US012782693B2

(12) United States Patent
Guan et al.

(10) Patent No.: US 12,782,693 B2
(45) Date of Patent: Nov. 3, 2026

(54) OPTICAL LENS, CAMERA MODULE, AND TERMINAL DEVICE

(71) Applicant: Jiangxi OFILM Optical Co., Ltd., Nanchang (CN)

(72) Inventors: Lei Guan, Nanchang (CN); Yurong Wang, Nanchang (CN); Jiao Lei, Nanchang (CN)

(73) Assignee: Jiangxi OFILM Optical Co., Ltd., Nanchang (CN)

( * ) Notice: Subject to any disclaimer, the term of this patent is extended or adjusted under 35 U.S.C. 154(b) by 176 days.

(21) Appl. No.: 18/934,459

(22) Filed: Nov. 1, 2024

(65) Prior Publication Data

US 2025/0172787 A1 May 29, 2025

(30) Foreign Application Priority Data

Nov. 23, 2023 (CN) ......................... 202311571195.0

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01); *G02B 13/007* (2013.01)

(58) Field of Classification Search
CPC ..... G02B 13/0045; G02B 9/64; G02B 13/007
USPC ........................................................... 359/726
See application file for complete search history.

(56) References Cited

U.S. PATENT DOCUMENTS

| | | | | |
|---|---|---|---|---|
| 9,958,651 | B2 | 5/2018 | Yeh | |
| 11,927,728 | B2 * | 3/2024 | Li | G02B 13/0045 |
| 2021/0181466 | A1 | 6/2021 | Lee et al. | |
| 2022/0057605 | A1 * | 2/2022 | Li | G02B 9/64 |
| 2022/0196980 | A1 * | 6/2022 | Lai | G02B 9/64 |
| 2022/0244501 | A1 * | 8/2022 | Wang | G02B 27/0012 |
| 2023/0375811 | A1 * | 11/2023 | Lai | G02B 13/0055 |
| 2024/0393569 | A1 * | 11/2024 | Lin | G02B 13/0025 |

FOREIGN PATENT DOCUMENTS

| | | | |
|---|---|---|---|
| CN | 214151210 | U | 9/2021 |
| CN | 214669836 | U | 11/2021 |
| CN | 114442263 | A | 5/2022 |
| CN | 218272885 | U | 1/2023 |

* cited by examiner

*Primary Examiner* — Sharrief I Broome
(74) *Attorney, Agent, or Firm* — ScienBiziP, P.C.

(57) ABSTRACT

An optical lens, a camera module, and a terminal device are provided. The optical lens includes a first lens, a second lens, a third lens, a fourth lens, a fifth lens, a sixth lens, a seventh lens, an eighth lens, and a ninth lens. The first lens has negative refractive power, the second lens has negative refractive power, the third lens has negative refractive power, the fourth lens has positive refractive power, the fifth lens has positive refractive power, the sixth lens has positive refractive power, the seventh lens has negative refractive power, the eighth lens has positive refractive power. The optical lens satisfies the following relationship: 16.5<TTL/F<18, TTL is a distance from the object side surface of the first lens to the imaging plane of the optical lens along the optical axis, F is the effective focal length of the optical lens.

20 Claims, 11 Drawing Sheets

OPTICAL LENS, CAMERA MODULE, AND TERMINAL DEVICE

FIELD

The subject matter relates to field of optical imaging, and more particularly, to an optical lens, a camera module, and a terminal device.

BACKGROUND

In recent years, with the development of camera technology, the requirements for imaging quality of an optical lens are higher and higher, and thin and light miniaturized structure features have gradually become the development trend of optical lenses. In the related art, under the design trend of light, thin and miniaturized optical lens, it is difficult to simultaneously meet the high-definition imaging requirements for optical lenses.

Therefore, improvement is desired.

SUMMARY

The present application provides an optical lens, a camera module, and an electronic device, and the optical lens can achieve excellent imaging quality while meeting the requirements of miniaturized design.

In a first aspect, the present application provides an optical lens. From an object side to an image side along an optical axis of the optical lens, the optical lens sequentially includes a first lens, a second lens, a third lens, a fourth lens, a fifth lens, a sixth lens, a seventh lens, an eighth and a ninth lens. The first lens has negative refractive power, an object side surface of the first lens is convex near the optical axis, and an image side surface of the first lens is concave near the optical axis. The second lens has negative refractive power, an object side surface of the second lens is convex near the optical axis, and an image side surface of the second lens is concave near the optical axis. The third lens has negative refractive power, and an image side surface of the third lens is concave near the optical axis. The fourth lens has positive refractive power, an object side surface of the fourth lens is convex near the optical axis, and an image side surface of the fourth lens is convex near the optical axis. The fifth lens has positive refractive power, an object side surface of the fifth lens is convex near the optical axis, and an image side surface of the fifth lens is concave near the optical axis. The sixth lens has positive refractive power, an object side surface of the sixth lens is convex near the optical axis, and an image side surface of the sixth lens is convex near the optical axis. The seventh lens has negative refractive power, an object side surface of the seventh lens is concave near the optical axis, and an image side surface of the seventh lens is concave near the optical axis. The eighth lens has positive refractive power, an object side surface of the eighth lens is convex near the optical axis, and an image side surface of the eighth lens is convex near the optical axis. The ninth lens has negative refractive power, and an image side surface of the ninth lens is concave near the optical axis. Lenses with refractive power are nine lenses, and the optical lens satisfies following relationships: $16.5<TTL/F<18$. TTL is a distance from the object side surface of the first lens to an imaging plane of the optical lens along the optical axis, which is the total optical length, and F is an effective focal length of the optical lens.

By setting the first lens to have negative refractive power, the object side surface of the first lens to be convex near the optical axis, and the image side surface of the first lens to be concave near the optical axis, which is beneficial for allowing large angle incident rays to enter the optical lens, and expanding the field of view range of the optical lens, and thus obtaining the characteristics of a large field of view. By setting the second lens to have negative refractive power, the object side surface of the second lens to be convex near the optical axis, and the image side surface of the second lens to be concave near the optical axis, which can make the incident ray enter the optical lens more smoothly through the first lens. This is beneficial for correcting the field curvature and astigmatism of the optical lens, enhancing the stability of the imaging effect of the optical lens, and thereby improving the imaging quality of the optical lens. By setting the third lens to have negative refractive power, and the image side surface of the third lens to be concave near the optical axis, which provides a reasonable incident angle for the introduction of edge rays, thereby resulting in the optical lens having a reasonable field of view. The fourth lens, the fifth lens, and the sixth lens are all positive lenses with biconvex shapes near the optical axis, which can compress the ray collected by the first lens, the second lens, and the third lens, and the incident rays can be transmitted smoothly, thereby improving the relative illumination of the optical lens and ensuring that the rays at the center and the edge of the field of view can be effectively converged, this can correct the edge aberration, enhance the resolving power of the optical lens, and further improve the imaging quality of the optical lens. By setting the seventh lens to have negative refractive power and the image side of the seventh lens to be concave near the optical axis, and the object side of the seventh lens to be concave near the optical axis, stray rays can be avoided, and the relative illumination at the edges can be increased. By setting the eighth lens to have positive refractive power and the image side of the seventh lens to be convex near the optical axis, and the object side of the seventh lens to be convex near the optical axis, edge aberration can be corrected, and the resolution capability of the optical lenses can be improved. By setting the eighth lens to have positive refractive power and the image side of the seventh lens to be convex near the optical axis, and the object side of the seventh lens to be convex near the optical axis. By setting the ninth lens as a negative lens, distortion, astigmatism, and field curvature can be corrected, and the imaging quality can be improved. The image side surface of the ninth lens is concave near the optical axis, the optical lens has a reasonable back focus, ensuring sufficient installation space for the filter, reducing the sensitivity of the optical lens while achieving a shorter total optical length, and the optical lens have a smaller volume.

By setting the optical lens to satisfy the relationship of $16.5<TTL/F<18$, the relationship between the total optical length of the optical lens and the effective focal length of the optical lens can be effectively controlled, and the situations where the size of the optical lens is too large or the effective focal length of the optical lens is too large can be avoided, and the optical lens can achieve miniaturization.

In a second aspect, the present application provides a camera module. The camera module includes an image sensor and the optical lens mentioned in the first aspect. The image sensor is located on the image side of the optical lens. The camera module with the optical lens mentioned in the first aspect has all the technical effects of the optical lens mentioned in the first aspect, and the camera module can meet requirement of miniaturization, and may have good imaging performance and variable aperture.

In a third aspect, the present application provides a terminal device. The electronic device includes a fixing member and the camera module mentioned in the second aspect. The camera module is disposed on the fixing member. The terminal device may be, but not limited to a smartphone, a computer, or a smartwatch. By incorporating the camera module of the present application into the electronic device, the terminal device may meet requirement of miniaturization, and may have good imaging performance and variable aperture.

BRIEF DESCRIPTION OF THE DRAWINGS

Implementations of the present technology will now be described, by way of embodiment, with reference to the attached figures. Obviously, the drawings are only some embodiments of the present disclosure. For those ordinary skill in the art, other drawings can be obtained based on these drawings without creative work.

DETAILED DESCRIPTION

Figure 1:
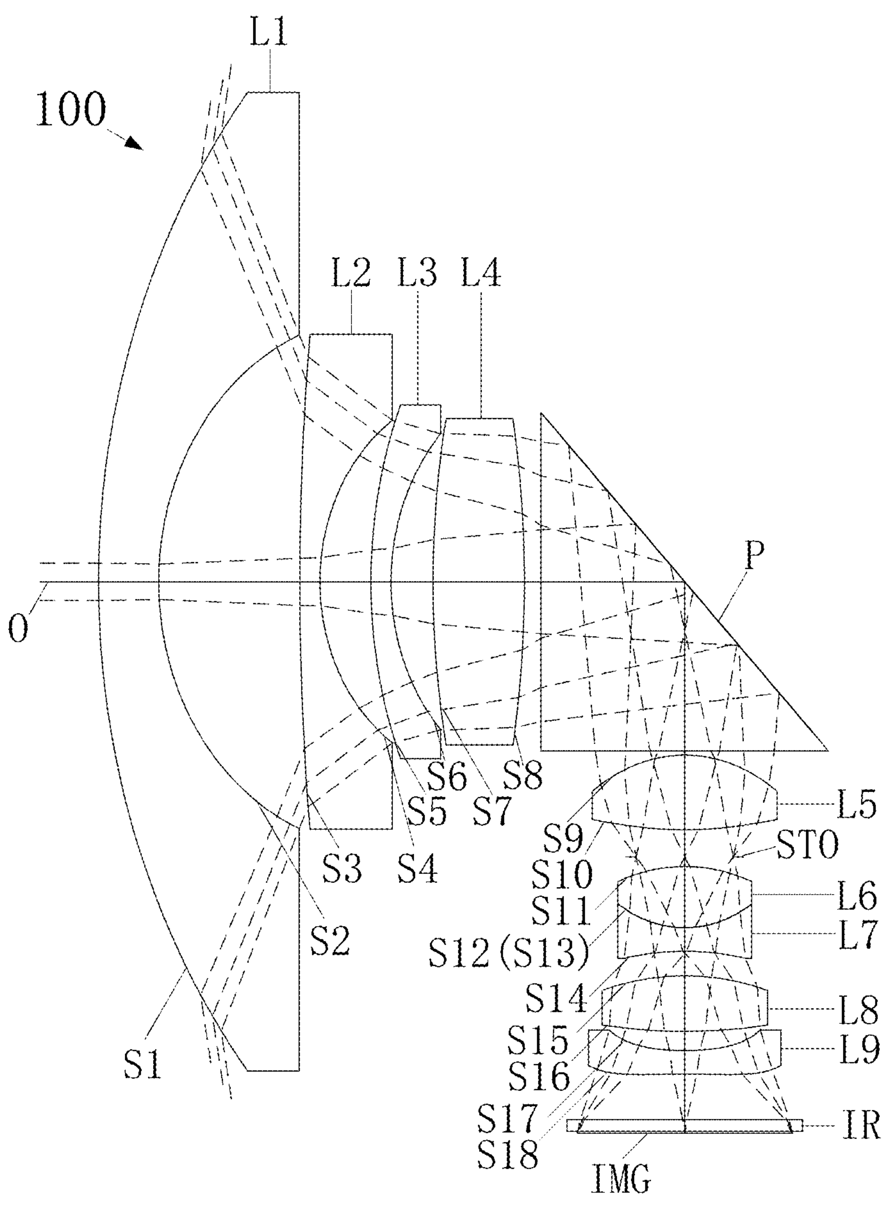
FIG. 1 is a schematic diagram of an optical lens according to a first embodiment of the present application.

In the present invention, the terms “first”, “second”, etc. are used to distinguish between different devices or components (which may be of the same or different types and configurations) and are not intended to indicate or imply the relative importance and number of the indicated devices or components. Unless otherwise indicated, “plurality” means two or more.

The technical solutions of the present application will be further described below in connection with the embodiments and the accompanying drawings.

In a first aspect, the present application provides an optical lens. From an object side to an image side along an optical axis of the optical lens, the optical lens sequentially includes a first lens, a second lens, a third lens, a fourth lens, a fifth lens, a sixth lens, a seventh lens, an eighth and a ninth lens. When imaging, rays enter the first lens, the second lens, the third lens, the fourth lens, the fifth lens, the sixth lens, the seventh lens, the eighth lens, and the ninth lens in sequence from the object side surface of the first lens and finally images on the imaging plane of the optical lens.

Furthermore, the first lens has negative refractive power, an object side surface of the first lens is convex near the optical axis, and an image side surface of the first lens is concave near the optical axis. The second lens has negative refractive power, an object side surface of the second lens is convex near the optical axis, and an image side surface of the second lens is concave near the optical axis. The third lens has negative refractive power, and an image side surface of the third lens is concave near the optical axis. The fourth lens has positive refractive power, an object side surface of the fourth lens is convex near the optical axis, and an image side surface of the fourth lens is convex near the optical axis. The fifth lens has positive refractive power, an object side surface of the fifth lens is convex near the optical axis, and an image side surface of the fifth lens is concave near the optical axis. The sixth lens has positive refractive power, an object side surface of the sixth lens is convex near the optical axis, and an image side surface of the sixth lens is convex near the optical axis. The seventh lens has negative refractive power, an object side surface of the seventh lens is concave near the optical axis, and an image side surface of the seventh lens is concave near the optical axis. The eighth lens has positive refractive power, an object side surface of the eighth lens is convex near the optical axis, and an image side surface of the eighth lens is convex near the optical axis. The ninth lens has negative refractive power, and an image side surface of the ninth lens is concave near the optical axis.

By setting the first lens to have negative refractive power, the object side surface of the first lens to be convex near the optical axis, and the image side surface of the first lens to be concave near the optical axis, which is beneficial for allowing large angle incident rays to enter the optical lens, and expanding the field of view range of the optical lens, and thus obtaining the characteristics of a large field of view. By setting the second lens to have negative refractive power, the object side surface of the second lens to be convex near the optical axis, and the image side surface of the second lens to be concave near the optical axis, which can make the incident ray enter the optical lens more smoothly through the first lens. This is beneficial for correcting the field curvature and astigmatism of the optical lens, enhancing the stability of the imaging effect of the optical lens, and thereby improving the imaging quality of the optical lens. By setting the third lens to have negative refractive power, and the image side surface of the third lens to be concave near the optical axis, which provides a reasonable incident angle for the introduction of edge rays, thereby resulting in the optical lens having a reasonable field of view. The fourth lens, the fifth lens, and the sixth lens are all positive lenses with biconvex shapes near the optical axis, which can compress the ray collected by the first lens, the second lens, and the third lens, and the incident rays can be transmitted smoothly, thereby improving the relative illumination of the optical lens and ensuring that the rays at the center and the edge of the field of view can be effectively converged, this can correct the edge aberration, enhance the resolving power of the optical lens, and further improve the imaging quality of the optical lens. By setting the seventh lens to have negative refractive power and the image side of the seventh lens to be concave near the optical axis, and the object side of the seventh lens to be concave near the optical axis, stray rays can be avoided, and the relative illumination at the edges can be increased. By setting the eighth lens to have positive refractive power and the image side of the seventh lens to be convex near the optical axis, and the object side of the seventh lens to be convex near the optical axis, edge aberration can be corrected, and the resolution capability of the optical lenses can be improved. By setting the eighth lens to have positive refractive power and the image side of the seventh lens to be convex near the optical axis, and the object side of the seventh lens to be convex near the optical axis. By setting the ninth lens as a negative lens, distortion, astigmatism, and field curvature can be corrected, and the imaging quality can be improved. The image side surface of the ninth lens is concave near the optical axis, the optical lens has a reasonable back focus, ensuring sufficient installation space for the filter, reducing the sensitivity of the optical lens while achieving a shorter total optical length, and the optical lens have a smaller volume.

Considering that the optical lens can be applied to electronic devices such as vehicle-mounted device and dashcams, or the optical lens can be applied to automobiles. When the optical lens is used as cameras on the vehicle, the materials of the first lens, the second lens, the third lens, the fourth lens, the fifth lens, the sixth lens, the seventh lens, the eighth lens, and the ninth lens can all be glass, which not only provides good optical effects but also reduces the impact of temperature on the above lenses. In multiple lenses of the optical lens, a part of lenses can be made of glass material, while others can be made of plastic material, this can ensure the reduction of temperature impact on the lens to achieve better imaging effect, the processing cost and weight reduction of the lens can be reduced, the processing cost of the optical lens can be reduced, and the overall weight of the optical lens can be reduced.

When the optical lens is applied to electronic devices such as smartphones and tablets, the material of the first lens, the second lens, the third lens, the fourth lens, the fifth lens, the sixth lens, the seventh lens, the eighth lens, and the ninth lens can be plastic to reduce the overall weight of the optical lens.

In some embodiments, since the advantages of simple manufacturing process and low production cost of the spherical lenses, and the ability to flexibly design the surface shape of the lenses, the imaging resolution capability of optical lenses can be improved. The spherical lenses can provide more flexible designs for the object side surface of the lens or the image side surface of the lens, the lens can effectively solve problems such as unclear imaging, distorted field of view, or narrow field of view in small and thin sizes, and the optical lens do not require too many lenses to have good imaging quality, and the length of the optical lens can be shortened. Therefore, the first lens, the second lens, the third lens, the fourth lens, the sixth lens, the seventh lens, and the eighth lens can all adopt spherical lenses, while the fifth lens and the ninth lens can all adopt aspheric lenses. Based on this design, the combination design of spherical and aspheric can not only improve the machinability of each lens, which is beneficial for surface design, but also make the object side surface of the lens or the image side surface of the lens to have more flexible design, and the lens can effectively solve problems such as unclear imaging, distorted field of view, or narrow field of view in small and thin sizes, and the length of the optical lens can be shortened. In other embodiments, the surfaces of each lens in the optical lens can be all spherical, all aspherical, or any combination of spherical surface and aspherical surface, there is no specific limitation in the embodiment.

In some embodiments, the optical lens further includes an aperture, the aperture can be an aperture stop and/or field apertures. For example, the aperture can be an aperture stop or a field aperture, or the aperture can be an aperture stop and a field aperture. By setting the aperture between the image side surface of the fifth lens and the object side surface of the sixth lens, the emitted rays are far away from the imaging plane of the optical lens, and the effective diameter of the optical lens can be reduced without reducing its farsightedness, thereby achieving miniaturization. In other embodiments, the aperture can also be set between other lenses, and there is no specific limitation in the embodiment.

In some embodiments, the optical lens further includes a filter, the filter is set between the ninth lens and the imaging plane of the optical lens. Optionally, the filter can be an infrared cutoff filter to remove infrared rays. Through visible rays, images can be rendered more in line with the human eye's visual experience, thereby enhancing image quality. In other embodiments, the filter may be an infrared bandpass filter to allow infrared rays to pass through and reflect visible rays, infrared imaging of the optical lens can be achieved, and the optical lens can image in low light environments or special application scenarios with good imaging quality. The filter can be made of plastic, optical glass coating, or other materials, there is no specific limitation in the embodiment.

In some embodiments, the optical lens satisfies following relationships: $16.5<TTL/F<18$, TTL is a distance from the object side surface of the first lens to an imaging plane of the optical lens along the optical axis, TTL is the total optical length, and F is an effective focal length of the optical lens.

When this relationship is satisfied, the relationship between the total optical length of the optical lens and the effective focal length of the optical lens can be effectively controlled, the situation where the size of the optical lens is too large or the effective focal length is too large can be avoided, and the miniaturization of the optical lens can be achieved.

In some embodiments, the optical lens further satisfies following relationships: $0.6<(SD11-SD10)/CT56<1.2$; SD10 is half of maximum effective aperture of the image side surface of the fifth lens, and SD11 is half of the maximum effective aperture of the object side surface of the sixth lens, CT56 is a distance from the image side surface of the fifth lens to the object side surface of the sixth lens along the optical axis.

Through the above relationship, the surface shapes of the image side surface of the fifth lens and the object side surface of the sixth lens can be reasonably configured, the deflection angle of the rays emitted from the fifth lens and then entering the sixth lens can be reduced, aberrations can be effectively corrected, and the assembly yield of the optical lens can be improved.

In some embodiments, the optical lens further satisfies following relationships: $2<BFL/(IMGH-SD18)<3$; CT56 is a distance from the image side surface of the ninth lens to the imaging plane of the optical lens along the optical axis, IMGH is half of an image height corresponding to a maximum field of view angle of the optical lens, and SD18 is half of maximum effective aperture of the image side surface of the ninth lens.

By reasonably configuring the back focus of the optical lens, the effective aperture of the lens closest to the imaging plane of the optical lens, and the image height of the optical lens, the optical lens can be easily matched with the image sensor to meet the angle requirements for the incident angle of the main rays, and the problems of color cast and shadows in the optical lens can be avoided.

In some embodiments, the optical lens further includes a prism, the optical lens further satisfies following relationships: $0.9<ATL/BTL<1.3$; ATL is a distance from the object side surface of the first lens to a reflective surface of the prism along the optical axis, BTL is a distance from the reflective surface of the prism to an imaging plane of the optical lens.

By reasonably configuring the total optical length of the optical lens located in front and behind the prism, the optical lens located in front and behind the prism have a centrally symmetrical structure, and the risk of interference during assembly of the optical lens can be avoided.

In some embodiments, the optical lens further satisfies following relationships: $1\ mm<SAG1+SD1/TAN(HFOV)<2\ mm$; SAG1 is a vector height of the object side of the first lens at a maximum effective aperture, SD1 is half of the maximum effective aperture of the object side of the first lens, and HFOV is half of the maximum field of view angle of the optical lens.

By reasonably configuring the maximum effective aperture of the object side of the first lens, the vector height at the maximum effective aperture, and the field of view angle of the optical lens, the surface shape of the object side surface of the first lens can be reasonably configured, and the viewpoint depth of the optical lens can be constrained, the problem of the object side surface of the first lens being too curved, which makes it difficult for the edge field of view rays to enter the second lens, can be avoided, and the optical lens have the characteristics of a large viewing angle and a large aperture.

In some embodiments, the optical lens further satisfies following relationships: $-9\ mm<N3*F3+N4*F4-CT34<-2\ mm$; N3 is a refractive index of the third lens, N4 is a refractive index of the fourth lens, F3 is an effective focal length of the third lens, F4 is an effective focal length of the fourth lens, CT34 is a distance from the image side surface of the third lens to the object side surface of the fourth lens along the optical axis.

In some embodiments, the optical lens further satisfies following relationships: $30<VD6-VD7<60$; VD6 is a Abbe number of the sixth lens, and VD7 is a Abbe number of the seventh lens.

By reasonably configuring the effective focal length, the refractive index, and the spacing of the third lens and the fourth lens, the temperature drift in environments can be reduced, and the imaging quality of the optical lens can be improved.

In some embodiments, the optical lens further satisfies following relationships: $-4<F1234/F<-2$; and/or $-8<F1/F<-6$; and/or $-12<F3/F<-7$; and/or $-6<F9/F<-3$; F1234 is a combined effective focal length of the first lens, the second lens, the third lens, and the fourth lens, F1 is an effective focal length of the first lens, F3 is an effective focal length of the third lens, and F9 is an effective focal length of the ninth lens.

When the above relationship is satisfied, the color difference between the sixth lens and the seventh lens can be effectively controlled, the overall color difference of the optical lens can be controlled, the risk of purple edge is reduced, and the imaging quality of the optical lens is improved.

In addition, the sixth lens and the seventh lens are glued together to further eliminate the color difference and correct the spherical aberration.

In some embodiments, the optical lens further satisfies following relationships: $-4<F1234/F<-2$; F1234 is a combined effective focal length of the first lens, the second lens, the third lens, and the fourth lens, F is the effective focal length of the optical lens.

When the above relationship is satisfied, the proportion of refractive power of the front lens of the optical lens is reasonably configured, the field of view of the optical lens can be improved, the distortion of the optical lens can be reasonably controlled, and the high pixel requirements within the field of view can be met.

In some embodiments, the optical lens further satisfies following relationships: $-8<F1/F<-6$, and/or $-4<F2/F<-3$, and/or, $-12<F3/F<-7$, and/or, $5<F4/F<8$, and/or, $2.5<F5/F<3.5$, and/or, $1.5<F6/F<2.5$, and/or, $-2<F7/F<-1$, and/or, $2<F8/F<4$, and/or, $-6<F9/F<-3$; F is the effective focal length of the optical lens, F1 is the effective focal length of the first lens, F2 is the effective focal length of the second lens, F3 is the effective focal length of the third lens, F4 is the effective focal length of the fourth lens, F5 is the effective focal length of the fifth lens, F6 is the effective focal length of the sixth lens, F7 is the effective focal length of the seventh lens, F8 is the effective focal length of the eighth lens, and F9 is the effective focal length of the ninth lens.

By reasonably configuring the ratio between the focal length of each lens and the focal length of the optical lens, the refractive power of each lens can be evenly distributed, and the aberrations of the optical lens are more easily corrected, thereby resulting in good image quality performance.

The optical lens can satisfy following relationships: $1\ mm^{-1}|<R14/R15/CT78<2\ mm^{-1}$. R14 is a curvature radius of the image side surface of the seventh lens along the optical axis, R15 is a curvature radius of the object side surface of the eighth lens along the optical axis; CT78 is a distance from the image side surface of the seventh lens to the object side surface of the eighth lens along the optical axis, and F9 is an effective focal length of the ninth lens.

By reasonably configuring the surface type of the image side surface of the seventh lens and the object side surface of the eighth lens, and the spacing between the image side surface of the seventh lens and the object side surface of the eighth lens, the surface shapes of the seventh lens and the eighth lens will not be too curved or flat, thereby reducing the risk of ghosting in the optical lens.

In some embodiments, the optical lens further satisfies following relationships: $1<(R11+|R12|+R14)/(R11+R12+R14)<2$; R11 is a curvature radius of the object side surface of the sixth lens at the optical axis, R12 is a curvature radius of the image side surface of the sixth lens along the optical axis, R14 is a curvature radius of the image side surface of the seventh lens along the optical axis.

When the above relationship is satisfied, the surface shapes of the object side surface and the image side surface of the sixth lens and the seventh lens are reasonably configured, the field curvature and astigmatism of the optical lens can be effectively corrected, and the imaging quality of the optical lens can be improved.

In some embodiments, the optical lens further satisfies following relationships: $-1<F1/R1<-0.5$, and/or $-2.5<F1/R2<-1.5$, and/or, $F2/R3<-0.2$ and/or, $-1.5<F2/R4<-1$, and/or, $|F3/R5|<2$, and/or, $-4<F3/R6<-1$, and/or, $0.3<F4/$ $R7<0.7$, and/or, $-0.8<F4/R8<-0.4$, and/or, $1.1<F5/R9<1.3$, and/or, $-0.6<F5/R10<-0.4$, and/or, $0.3<F6/R11<0.8$, and/or, $-1.5<F6/R12<-1$, and/or, $0.6<F7/R13<1$, $-0.4<F7/R14<-0.1$, and/or, $0.2<F8/R15<0.5$, and/or, $-1<F8/R16<-0.5$, and/or, $0.2<|F9/R17|<0.6$, and/or, $-6<F9/R18<-3$; F1 is the effective focal length of the first lens, F2 is the effective focal length of the second lens, F3 is the effective focal length of the third lens, F4 is the effective focal length of the fourth lens, F5 is the effective focal length of the fifth lens, F6 is the effective focal length of the sixth lens, F7 is the effective focal length of the seventh lens, F8 is the effective focal length of the eighth lens, and F9 is the effective focal length of the ninth lens; R1 is the curvature radius of the object side surface of the first lens along the optical axis, R2 is the curvature radius of the image side surface of the first lens along the optical axis, R3 is the curvature radius of the object side surface of the second lens along the optical axis, R4 is the curvature radius of the image side surface of the second lens along the optical axis, R5 is the curvature radius of the object side surface of the third lens along the optical axis, R6 is the curvature radius of the image side surface of the third lens along the optical axis, R7 is the curvature radius of the object side surface of the fourth lens along the optical axis, R8 is the curvature radius of the image side surface of the fourth lens along the optical axis, R9 is the curvature radius of the object side surface of the fifth lens along the optical axis, R10 is the curvature radius of the image side surface of the fifth lens element along the optical axis, R11 is the curvature radius of the object side surface of the sixth lens element along the optical axis, R12 is the curvature radius of the image side surface of the sixth lens element along the optical axis, R13 is the curvature radius of the object side surface of the seventh lens element along the optical axis, R14 is the curvature radius of the image side surface of the seventh lens element along the optical axis, R15 is the curvature radius of the object side surface of the eighth lens element along the optical axis, R16 is the curvature radius of the image side surface of the eighth lens element along the optical axis, R17 is the curvature radius of the object side surface of the ninth lens element along the optical axis, and R18 is the curvature radius of the image side surface of the ninth lens element along the optical axis.

By controlling the curvature radius of the object side surface and the image side surface of the lens along the optical axis and the effective focal length of the optical lens within a reasonable range, the astigmatism, field curvature, and distortion of the optical lens can be corrected, the optical total length of the optical lens can be compressed, and miniaturization of optical lenses can be achieved.

The following will provide a detailed explanation of the optical lens of the embodiment based on specific parameters.

First Embodiment

Referring to FIG. 1, the optical lens 100, from the object side to the image side along the optical axis direction, sequentially includes a first lens L1, a second lens L2, a third lens L3, a fourth lens L4, a prism P, a fifth lens L5, a aperture STO, a sixth lens L6, a seventh lens L7, an eighth lens L8 and a ninth lens L9. The materials of the first lens L1, the second lens L2, the third lens L3, the fourth lens L4, the fifth lens L5, the sixth lens L6, the seventh lens L7, the eighth lens L8, and the ninth lens L9 can be referred to as described in the above embodiments and will not be repeated herein.

The first lens L1 has positive refractive power, the second lens L2 has negative refractive power, the third lens L3 has negative refractive power, the fourth lens L4 has positive refractive power, the fifth lens L5 has positive refractive power, the sixth lens L6 has positive refractive power, the seventh lens L7 has negative refractive power, the eighth lens L8 has positive refractive power, and the ninth lens L9 has negative refractive power.

The object side surface S1 of the first lens L1 is convex near the optical axis O, and the image side surface S2 of the first lens L1 is concave near the optical axis O. The object side surface S3 of the second lens L2 is convex near the optical axis O, and the image side surface S4 of the second lens L2 is concave near the optical axis O. The object side surface S5 of the third lens L3 is convex near the optical axis O, and the image side surface S6 of the third lens L3 is concave near the optical axis O. The object side surface S7 and the image side surface S8 of the fourth lens L4 are both convex near the optical axis O. The object side surface S9 and the image side surface S10 of the fifth lens L5 are both convex near the optical axis O. The object side surface S11 and the image side surface S12 of the sixth lens L6 are both convex near the optical axis O. The object side surface S13 and the image side surface S14 of the seventh lens L7 are both concave near the optical axis O. The object side surface S15 and the image side surface S16 of the eighth lens L8 are both convex near the optical axis O. The object side surface S17 and the image side surface S18 of the ninth lens L9 are both concave near the optical axis O.

Specifically, taking the effective focal length F of the optical lens 100 as 1.861 mm, the aperture number FNO of the optical lens 100 as 2.03, half of the maximum field of view HFOV of the optical lens 100 as 100 deg, and the total optical length TTL of the optical lens 100 as 31.524 mm as an example, the other parameters of the optical lens 100 are given in Table 1 below. The elements along the optical axis O of the optical lens 100 from the object side to the image side are sequentially arranged in the order of the elements from top to bottom in Table 1. In the same lens, the surface with the smaller surface numeral is the object side of the lens, and the surface with the larger surface numeral is the image side of the lens, e.g., the surface numerals S1 and S2 are the object side surface S1 and image side surface S2 of the first lens L1, respectively. The Y radius in Table 1 is the radius of curvature of the object side surface or the image side surface of the related surface numeral at the optical axis. In a "thickness" column of each lens, the first value is the thickness of the lens at the optical axis, and the second value is the distance from the image side surface of the lens to the next surface at the optical axis. The value of the aperture STO in the "thickness" column is the distance from the aperture STO to the vertex of the latter surface (the vertex refers to the intersection point of the surface and the optical axis O) on the optical axis O. By default, the direction from the object side surface S1 of the first lens L1 to the image side surface of the last lens is the positive direction of the optical axis O, when the thickness of the aperture STO is negative, it indicates that the aperture STO is set to the right of the vertex of the latter surface, and when the thickness of the aperture STO is positive, the aperture STO is set to the left of the vertex of the latter surface. The units of Y radius, thickness, and effective focal length in Table 1 are mm. The reference wavelength for the effective focal length of each lens in Table 1 is 555 nm, and the reference wavelength for the refractive index and Abbe number of each lens in Table 1 is 587 nm.

TABLE 1

| F = 1.861 mm, FNO = 2.03, HFOV = 100deg, TTL = 31.524 mm | | | | | | | | |
|---|---|---|---|---|---|---|---|---|
| Surface numeral | Surface name | Surface type | Y radius | Thickness | Material | Refractive index | Abbe number | Effective focal length |
| | object surface | sphere | infinity | infinity | | | | |
| 1 | first | sphere | 19.553 | 1.800 | glass | 1.804 | 46.503 | −13.691 |
| 2 | lens L1 | sphere | 6.771 | 4.225 | | | | |
| 3 | second | sphere | 65.951 | 0.600 | glass | 1.835 | 42.722 | −6.426 |
| 4 | lens L2 | sphere | 4.960 | 1.527 | | | | |
| 5 | third | sphere | 11.854 | 0.600 | glass | 1.497 | 81.200 | −21.295 |
| 6 | lens L3 | sphere | 5.504 | 1.257 | | | | |
| 7 | fourth | sphere | 22.143 | 2.734 | glass | 1.847 | 23.780 | 14.283 |
| 8 | Lens L4 | sphere | −25.551 | 0.500 | | | | |
| 9 | prism | sphere | infinity | 4.300 | glass | 1.847 | 23.78 | |
| 10 | | sphere | infinity | 4.300 | | | | |
| 11 | | sphere | infinity | 0.103 | | | | |
| 12 | fifth | asphere | 4.502 | 1.896 | glass | 1.619 | 63.855 | 5.580 |
| 13 | lens L5 | asphere | −12.582 | 0.687 | | | | |
| 14 | aperture STO | sphere | infinity | 0.245 | | | | |
| 15 | sixth | sphere | 6.571 | 1.554 | glass | 1.497 | 81.608 | 4.614 |
| 16 | Lens L6 | sphere | −3.270 | 0.000 | | | | |
| 17 | seventh | sphere | −3.270 | 0.600 | glass | 1.808 | 22.764 | −3.140 |
| 18 | lens L7 | sphere | 15.494 | 0.604 | | | | |
| 19 | eighth | sphere | 13.254 | 1.410 | glass | 1.923 | 20.880 | 6.518 |
| 20 | lens L8 | sphere | −8.728 | 0.486 | | | | |
| 21 | ninth | asphere | −18.062 | 0.600 | glass | 1.851 | 40.100 | −9.695 |
| 22 | lens L9 | asphere | 10.215 | 1.151 | | | | |
| 23 | filter IR | sphere | infinity | 0.300 | glass | 1.520 | 64.200 | |
| 24 | | sphere | infinity | 0.045 | | | | |
| | imaging plane IMG | sphere | infinity | 0.000 | | | | |

In the first embodiment, the object side surface and image side surface of the fifth lens L5 and the object side surface and image side surface the ninth lens L9 are aspherical surfaces, and the surface shape x of the aspherical surface lens may be qualified using, but not limited to, the following aspherical surface formula:

$$x = \frac{ch^2}{1 + \sqrt{1 - (k+1)c^2h^2}} + \sum Aih^i$$

x is the distance vector height of the aspherical surface from the vertex of the aspherical surface at a position of height h along the optical axis o, c is paraxial curvature of the aspherical surface, c=1/R (i.e., the paraxial curvature c is the reciprocal of the Y radius R in Table 1), k is cone constant, Ai is a correction coefficient corresponding to the $i^{th}$ high-order term of the aspherical surface. Table 2 shows the high-order coefficients A4, A6, A8, A10, A12, A14 and A16 that applied for the aspherical surfaces in the first embodiment.

TABLE 2

| Surface numeral | 12 | 13 | 21 | 22 |
|---|---|---|---|---|
| k | 1.89960E−01 | −1.73580E+00 | −1.56059E+02 | 9.20104E+00 |
| A4 | −7.71730E−04 | 1.03753E−03 | −1.64940E−02 | −1.11118E−02 |
| A6 | −6.42263E−05 | −7.97318E−05 | 9.92510E−04 | 5.96808E−04 |
| A8 | 9.23756E−07 | 4.26255E−06 | −5.69596E−05 | −4.84126E−05 |
| A10 | −4.68245E−07 | −1.71492E−07 | −2.99977E−06 | −7.99523E−07 |
| A12 | −1.37029E−14 | −6.02226E−09 | −2.66818E−07 | 2.20914E−08 |
| A14 | −1.57846E−11 | 8.53271E−10 | 4.22088E−08 | −2.56182E−09 |
| A16 | 0.00000E+00 | 0.00000E+00 | 0.00000E+00 | 0.00000E+00 |

Figure 2:
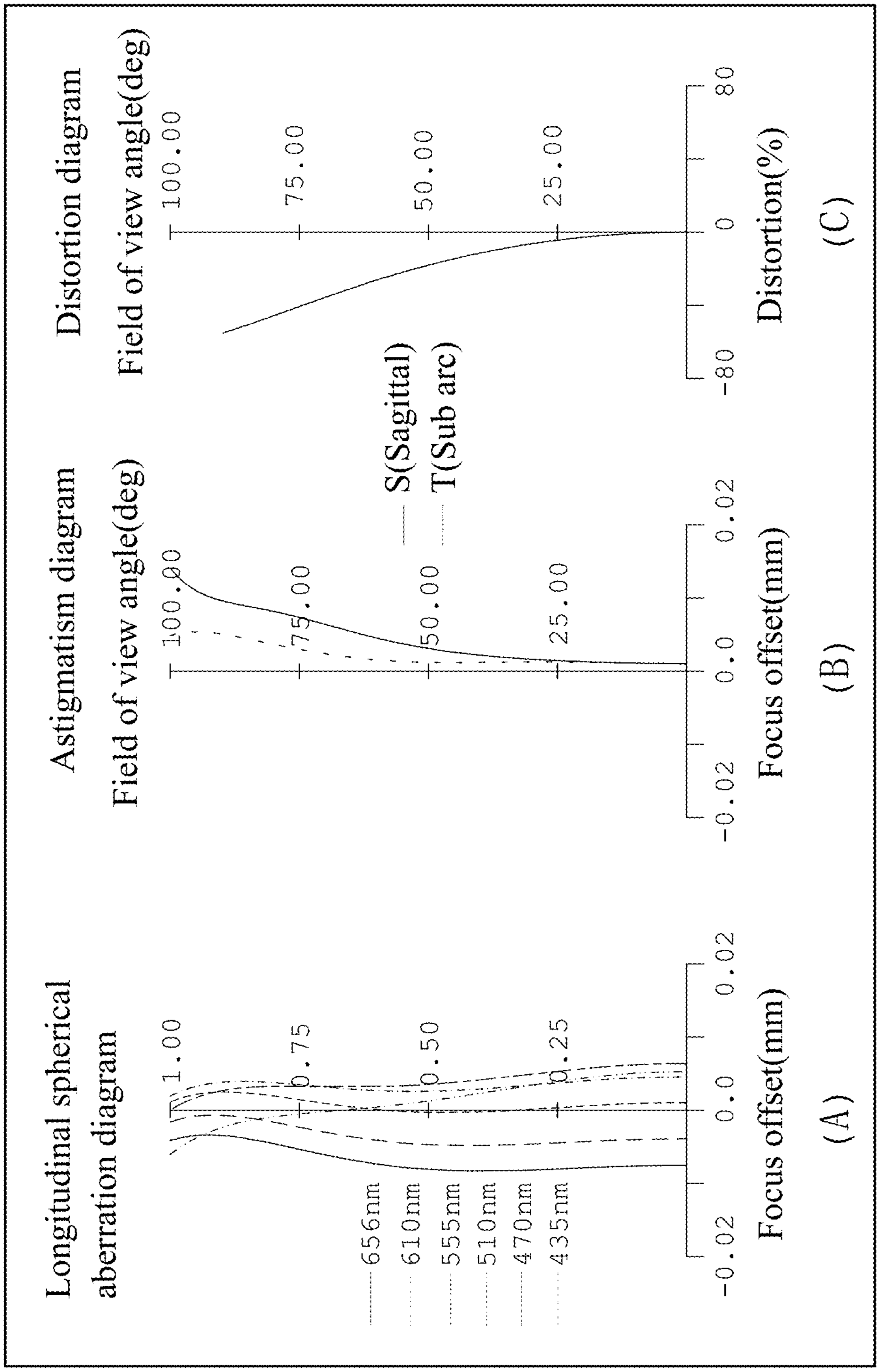
FIG. 2 shows a longitudinal spherical aberration diagram, an astigmatism diagram, and a distortion diagram of the optical lens of the first embodiment of the present application.

Referring to (A) in FIG. 2, (A) in FIG. 2 illustrates a graph of the light spherical aberration of the optical lens 100 of the first embodiment at wavelengths of 656 nm, 610 nm, 555 nm, 510 nm, 470 nm, and 435 nm. In (A) of FIG. 2, The horizontal axis along the X-axis represents the focus offset, and the vertical axis along the Y-axis represents the normalized field of view. As can be seen from (A) in FIG. 2, the optical lens 100 in the first embodiment has a better value of spherical aberration, indicating that the optical lens 100 in this embodiment has a better imaging quality.

Referring to (B) in FIG. 2, (B) in FIG. 2 shows a light dispersion diagram of the optical lens 100 in the first embodiment at a wavelength of 555 nm. The horizontal axis along the X-axis represents the focus offset, the vertical axis along the Y-axis represents the field of view angle, and unit is deg. The astigmatism curves represent the sub-arc imaging surface bending T and the arc-vector imaging surface bending S, as can be seen from (B) in FIG. 2, the image dispersion of the optical lens 100 is better compensated at this wavelength.

Referring to (C) in FIG. 2, (C) in FIG. 2 shows the distortion curve of the optical lens 100 in the first embodiment at a wavelength of 555 nm. The horizontal axis along the X-axis represents the focus offset, the vertical axis along the Y-axis represents the field of view angle, and unit is deg. As can be seen from (C) in FIG. 2, at a wavelength of 555 nm, the distortion of the optical lens 100 can be corrected.

Second Embodiment

Figure 3:
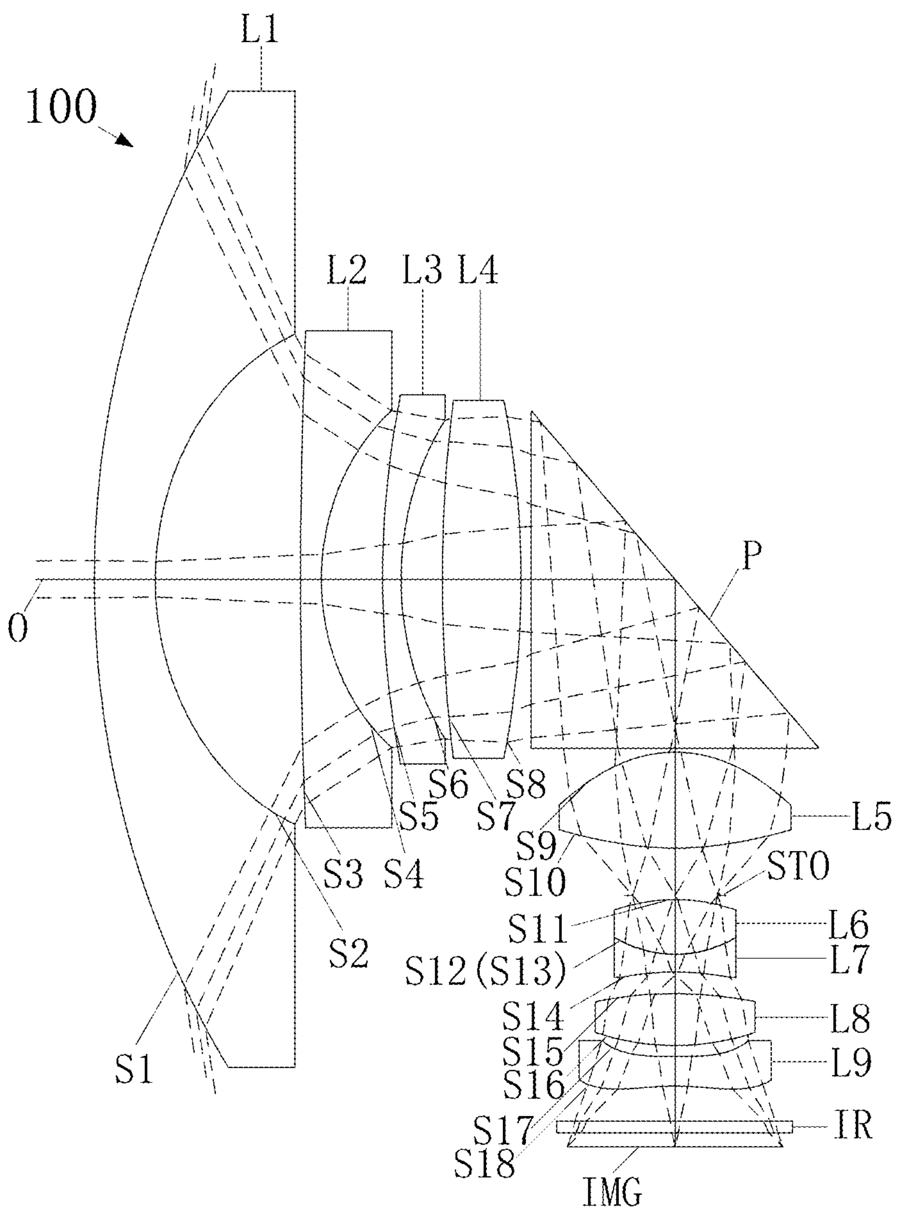
FIG. 3 is a schematic diagram of an optical lens according to a second embodiment of the present application.

Referring to FIG. 3, the optical lens 100, from the object side to the image side along the optical axis direction, sequentially includes a first lens L1, a second lens L2, a third lens L3, a fourth lens L4, a prism P, a fifth lens L5, a aperture STO, a sixth lens L6, a seventh lens L7, an eighth lens L8 and a ninth lens L9. The materials of the first lens L1, the second lens L2, the third lens L3, the fourth lens L4, the fifth lens L5, the sixth lens L6, the seventh lens L7, the eighth lens L8, and the ninth lens L9 can be referred to as described in the above embodiments and will not be repeated herein.

The first lens L1 has negative refractive power, the second lens L2 has negative refractive power, the third lens L3 has negative refractive power, the fourth lens L4 has positive refractive power, the fifth lens L5 has positive refractive power, the sixth lens L6 has positive refractive power, the seventh lens L7 has negative refractive power, the eighth lens L8 has positive refractive power, and the ninth lens L9 has negative refractive power.

The object side surface S1 of the first lens L1 is convex near the optical axis O, and the image side surface S2 of the first lens L1 is concave near the optical axis O. The object side surface S3 of the second lens L2 is convex near the optical axis O, and the image side surface S4 of the second lens L2 is concave near the optical axis O. The object side surface S5 of the third lens L3 is convex near the optical axis O, and the image side surface S6 of the third lens L3 is concave near the optical axis O. The object side surface S7 and the image side surface S8 of the fourth lens L4 are both convex near the optical axis O. The object side surface S9 and the image side surface S10 of the fifth lens L5 are both convex near the optical axis O. The object side surface S11 and the image side surface S12 of the sixth lens L6 are both convex near the optical axis O. The object side surface S13 and the image side surface S14 of the seventh lens L7 are both concave near the optical axis O. The object side surface S15 and the image side surface S16 of the eighth lens L8 are both convex near the optical axis O. The object side surface S17 and the image side surface S18 of the ninth lens L9 are both concave near the optical axis O.

In the second embodiment, taking the effective focal length F of the optical lens 100 as 1.851 mm, the aperture number FNO of the optical lens 100 as 2.03, half of the maximum field of view HFOV of the optical lens 100 as 100 deg, and the total optical length TTL of the optical lens 100 as 31.695 mm as an example.

The other parameters in the second embodiment are given in Table 3 below, and the definitions of each parameter can be obtained from the description of the previous explanation, which will not be repeated here. The units of Y radius, thickness, and effective focal length in Table 3 are mm. The reference wavelength for the effective focal length of each lens in Table 3 is 555 nm, and the reference wavelength for the refractive index and Abbe number of each lens in Table 3 is 587 nm.

TABLE 3

F = 1.851 mm, FNO = 2.03, HFOV = 100deg, TTL = 31.695 mm

| Surface numeral | Surface name | Surface type | Y radius | Thickness | Material | Refractive index | Abbe number | Effective focal length |
|---|---|---|---|---|---|---|---|---|
| | object surface | sphere | infinity | infinity | | | | |
| 1 | first | sphere | 21.249 | 1.823 | glass | 1.911 | 35.250 | −12.527 |
| 2 | lens L1 | sphere | 6.753 | 4.339 | | | | |
| 3 | second | sphere | 130.000 | 0.620 | glass | 1.835 | 42.720 | −6.770 |
| 4 | lens L2 | sphere | 5.427 | 1.831 | | | | |
| 5 | third | sphere | 20.867 | 0.550 | glass | 1.593 | 68.624 | −17.661 |
| 6 | lens L3 | sphere | 6.916 | 1.233 | | | | |
| 7 | fourth | sphere | 31.743 | 2.354 | glass | 2.001 | 25.460 | 12.646 |
| 8 | lens L4 | sphere | −20.500 | 0.300 | | | | |
| 9 | prism | sphere | infinity | 4.300 | glass | 1.847 | 23.78 | |
| 10 | | sphere | infinity | 4.300 | | | | |
| 11 | | sphere | infinity | 0.100 | | | | |
| 12 | fifth | asphere | 4.613 | 2.438 | glass | 1.619 | 63.855 | 5.576 |
| 13 | lens L5 | asphere | −11.073 | 1.212 | | | | |
| 14 | aperture STO | sphere | infinity | 0.100 | | | | |
| 15 | sixth | sphere | 6.385 | 1.391 | glass | 1.593 | 68.620 | 4.390 |
| 16 | Lens L6 | sphere | −4.054 | 0.000 | | | | |
| 17 | seventh | sphere | −4.054 | 0.450 | glass | 1.923 | 18.900 | −3.012 |
| 18 | lens L7 | sphere | 9.603 | 0.452 | | | | |
| 19 | eighth | sphere | 14.005 | 1.319 | glass | 1.946 | 17.980 | 5.791 |
| 20 | lens L8 | sphere | −8.723 | 0.281 | | | | |
| 21 | ninth | asphere | −35.201 | 0.752 | glass | 1.851 | 40.100 | −8.254 |
| 22 | lens L9 | asphere | 8.917 | 1.210 | | | | |
| 23 | filter IR | sphere | infinity | 0.300 | glass | 1.520 | 64.200 | |
| 24 | | sphere | infinity | 0.040 | | | | |
| | imaging plane IMG | sphere | infinity | 0.000 | | | | |

In the second embodiment, Table 4 shows the high-order coefficients that applied for the aspherical surfaces in the second embodiment, and the surface type of each aspherical surface can be defined by the formula given in the first embodiment.

TABLE 4

| Surface numeral | 12 | 13 | 21 | 22 |
|---|---|---|---|---|
| k | −4.80000E−02 | 6.86000E−01 | 6.21400E+00 | 3.64299E+02 |
| A4 | 2.46800E−04 | −1.11900E−03 | 6.80800E−03 | 2.27700E−03 |
| A6 | 3.29000E−06 | 6.35200E−05 | 3.39100E−04 | 3.09400E−04 |
| A8 | 3.98300E−06 | −5.06900E−06 | −2.72200E−05 | −1.64500E−05 |
| A10 | −1.39500E−07 | 3.25800E−07 | 6.58100E−06 | 2.35400E−06 |
| A12 | −3.03700E−10 | 6.17600E−10 | −4.36000E−08 | −1.06500E−09 |
| A14 | 1.95100E−09 | 1.68200E−12 | 6.25800E−10 | 6.78200E−10 |
| A16 | 0.00000E+00 | 0.00000E+00 | 0.00000E+00 | 0.00000E+00 |

Figure 4:
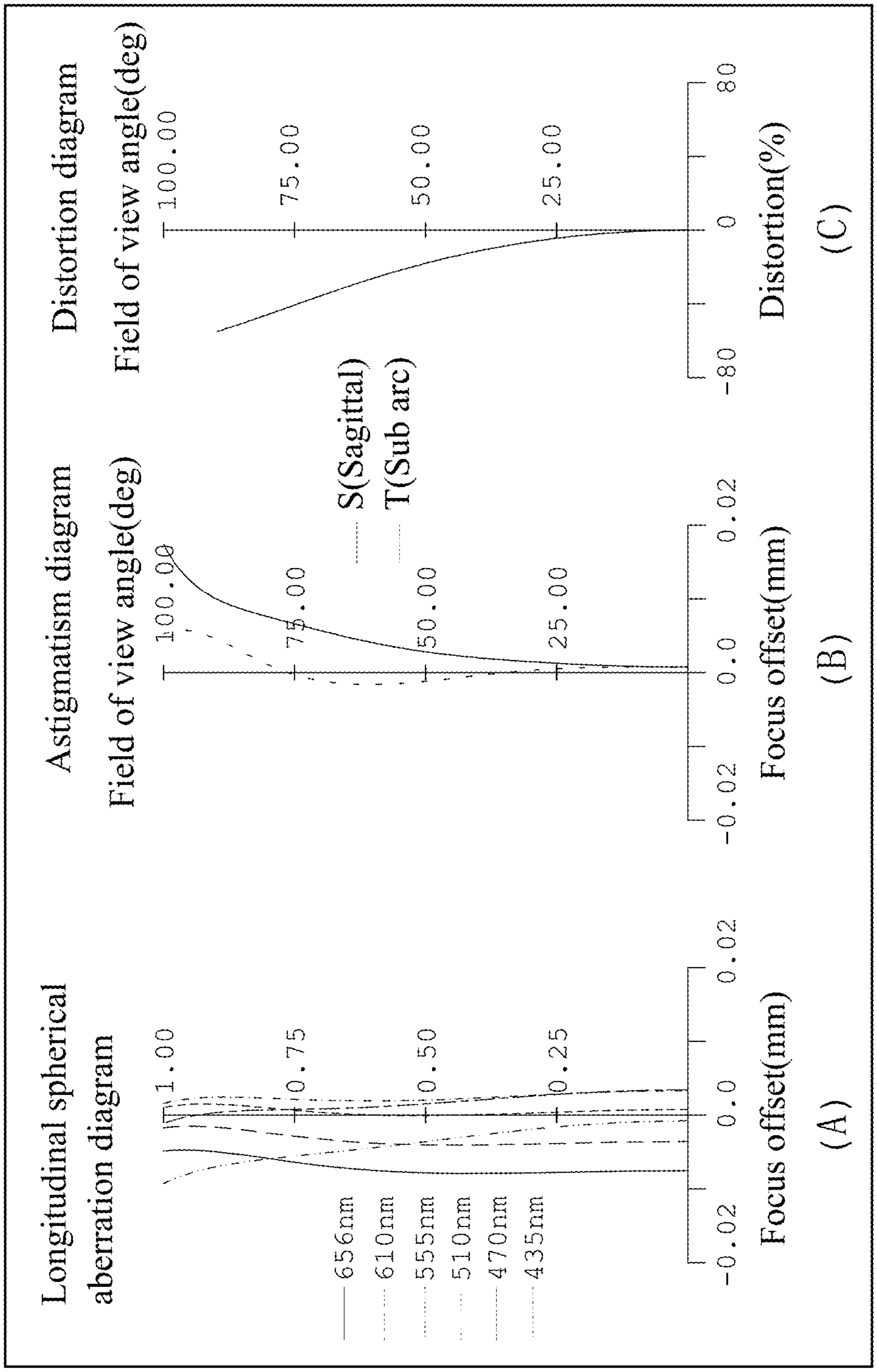
FIG. 4 shows a longitudinal spherical aberration diagram, an astigmatism diagram, and a distortion diagram of the optical lens of the second embodiment of the present application.

Referring to FIG. 4, from the spherical aberration curve of (A) in FIG. 4, the astigmatism curve of (B) in FIG. 4, and the distortion curve of (C) in FIG. 4, it can be seen that the longitudinal spherical aberration, astigmatism, and distortion of the optical lens 100 are well controlled, thus the optical lens 100 of this embodiment has good imaging quality. The wavelengths corresponding to the curves in (A) FIG. 4, (B) FIG. 4, and (C) of FIG. 4 can refer to the description of (A) of FIG. 2, (B) of FIG. 2, and (C) of FIG. 2 in the first embodiment, which will not be repeated here.

Third Embodiment

Figure 5:
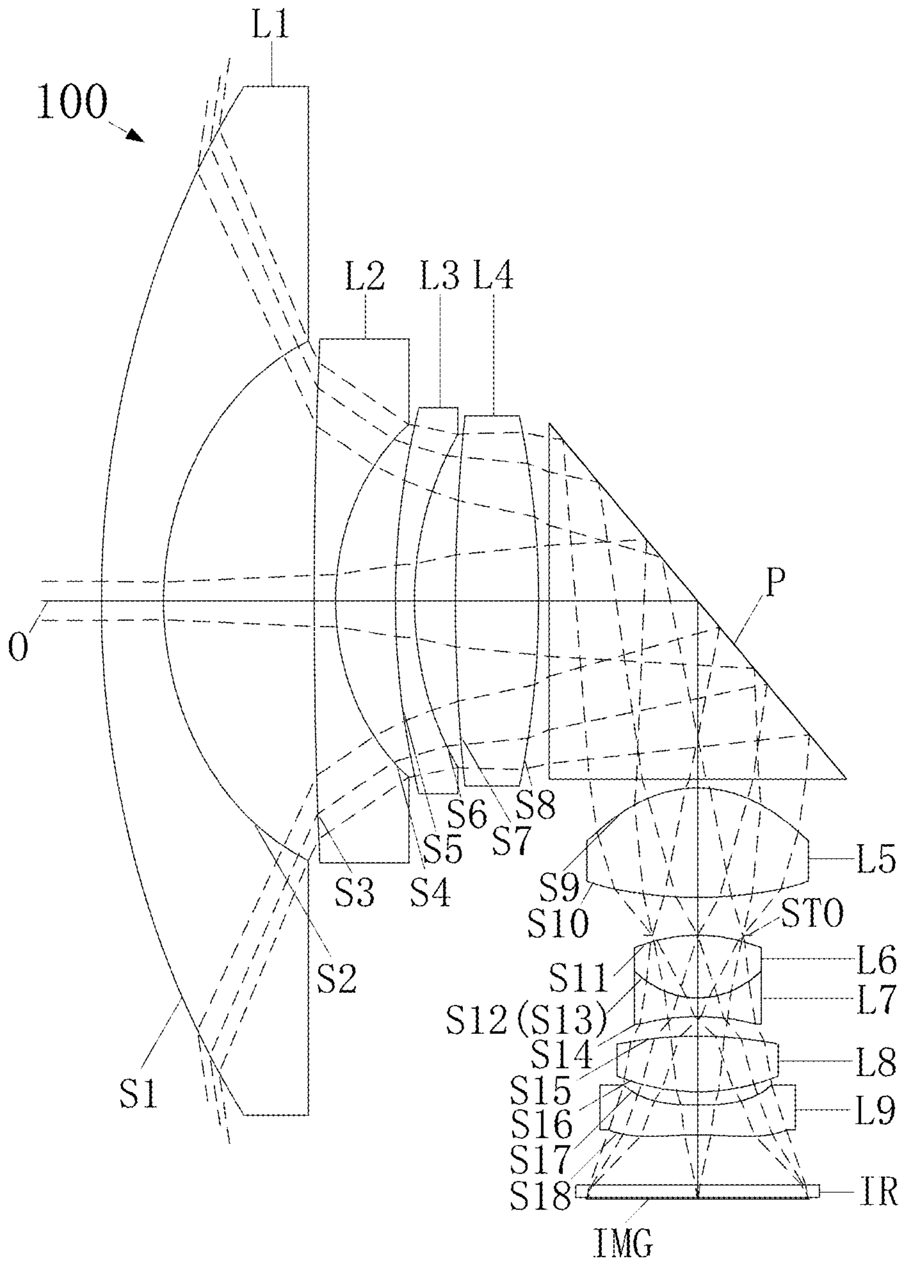
FIG. 5 is a schematic diagram of an optical lens according to a third embodiment of the present application.

Referring to FIG. 5, the optical lens 100, from the object side to the image side along the optical axis direction, sequentially includes a first lens L1, a second lens L2, a third lens L3, a fourth lens L4, a prism P, a fifth lens L5, a aperture STO, a sixth lens L6, a seventh lens L7, an eighth lens L8 and a ninth lens L9. The materials of the first lens L1, the second lens L2, the third lens L3, the fourth lens L4, the fifth lens L5, the sixth lens L6, the seventh lens L7, the eighth lens L8, and the ninth lens L9 can be referred to as described in the above embodiments and will not be repeated herein.

The first lens L1 has negative refractive power, the second lens L2 has negative refractive power, the third lens L3 has negative refractive power, the fourth lens L4 has positive refractive power, the fifth lens L5 has positive refractive power, the sixth lens L6 has positive refractive power, the seventh lens L7 has negative refractive power, the eighth lens L8 has positive refractive power, and the ninth lens L9 has negative refractive power.

The object side surface S1 of the first lens L1 is convex near the optical axis O, and the image side surface S2 of the first lens L1 is concave near the optical axis O. The object side surface S3 of the second lens L2 is convex near the optical axis O, and the image side surface S4 of the second lens L2 is concave near the optical axis O. The object side surface S5 of the third lens L3 is convex near the optical axis O, and the image side surface S6 of the third lens L3 is concave near the optical axis O. The object side surface S7 and the image side surface S8 of the fourth lens L4 are both convex near the optical axis O. The object side surface S9 and the image side surface S10 of the fifth lens L5 are both convex near the optical axis O. The object side surface S11 and the image side surface S12 of the sixth lens L6 are both convex near the optical axis O. The object side surface S13 and the image side surface S14 of the seventh lens L7 are both concave near the optical axis O. The object side surface S15 and the image side surface S16 of the eighth lens L8 are both convex near the optical axis O. The object side surface S17 and the image side surface S18 of the ninth lens L9 are both concave near the optical axis O.

In the third embodiment, taking the effective focal length F of the optical lens 100 as 1.857 mm, the aperture number FNO of the optical lens 100 as 2, half of the maximum field of view HFOV of the optical lens 100 as 100 deg, and the total optical length TTL of the optical lens 100 as 31.694 mm as an example.

The other parameters in the third embodiment are given in Table 5 below, and the definitions of each parameter can be obtained from the description of the previous explanation, which will not be repeated here. The units of Y radius, thickness, and effective focal length in Table 5 are mm. The reference wavelength for the effective focal length of each lens in Table 5 is 555 nm, and the reference wavelength for the refractive index and Abbe number of each lens in Table 5 is 587 nm.

TABLE 5

| F = 1.857 mm, O = 2, OV = 100deg, L = 31.694 mm | | | | | | | | |
|---|---|---|---|---|---|---|---|---|
| Surface numeral | Surface name | Surface type | Y radius | Thickness | Material | Refractive index | Abbe number | Effective focal length |
| | object surface | sphere | infinity | infinity | | | | |
| 1 | first | sphere | 20.766 | 1.800 | glass | 1.835 | 42.720 | −12.793 |
| 2 | lens L1 | sphere | 6.793 | 4.356 | | | | |
| 3 | second | sphere | 123.758 | 0.620 | glass | 1.835 | 42.720 | −6.678 |
| 4 | lens L2 | sphere | 5.344 | 1.729 | | | | |
| 5 | third | sphere | 16.238 | 0.550 | glass | 1.593 | 68.624 | −21.408 |
| 6 | lens L3 | sphere | 7.044 | 1.188 | | | | |
| 7 | fourth | sphere | 36.371 | 2.407 | glass | 1.847 | 23.780 | 14.452 |
| 8 | lens L4 | sphere | −18.082 | 0.300 | | | | |
| 9 | prism | sphere | infinity | 4.300 | glass | 1.847 | 23.78 | |
| 10 | | sphere | infinity | 4.300 | | | | |
| 11 | | sphere | infinity | 0.218 | | | | |
| 12 | fifth | asphere | 4.216 | 2.644 | glass | 1.619 | 63.855 | 5.453 |
| 13 | lens L5 | asphere | −13.072 | 0.912 | | | | |

TABLE 5-continued

| F = 1.857 mm, O = 2, OV = 100deg, L = 31.694 mm | | | | | | | | |
|---|---|---|---|---|---|---|---|---|
| Surface numeral | Surface name | Surface type | Y radius | Thickness | Material | Refractive index | Abbe number | Effective focal length |
| 14 | aperture STO | sphere | infinity | 0.000 | | | | |
| 15 | sixth | sphere | 5.709 | 1.512 | glass | 1.550 | 75.496 | 3.723 |
| 16 | Lens L6 | sphere | −2.905 | 0.000 | | | | |
| 17 | seventh | sphere | −2.905 | 0.450 | glass | 1.808 | 22.764 | −2.555 |
| 18 | lens L7 | sphere | 7.838 | 0.475 | | | | |
| 19 | eighth | sphere | 14.589 | 1.341 | glass | 1.923 | 20.880 | 5.399 |
| 20 | lens L8 | sphere | −7.326 | 0.321 | | | | |
| 21 | ninth | asphere | −12.238 | 0.722 | glass | 1.851 | 40.100 | −7.328 |
| 22 | lens L9 | asphere | 13.193 | 1.210 | | | | |
| 23 | filter IR | sphere | infinity | 0.300 | glass | 1.520 | 64.200 | |
| 24 | | sphere | infinity | 0.039 | | | | |
| | imaging plane IMG | sphere | infinity | 0.000 | | | | |

In the third embodiment, Table 6 shows the high-order coefficients that applied for the aspherical surfaces in the third embodiment, and the surface type of each aspherical surface can be defined by the formula given in the first embodiment.

TABLE 6

| Surface numeral | 12 | 13 | 21 | 22 |
|---|---|---|---|---|
| k | 2.89706E−02 | 4.98832E−01 | −5.32466E+01 | −6.10413E+01 |
| A4 | 7.06871E−04 | −1.12028E−03 | 1.98163E−02 | 9.42783E−03 |
| A6 | 4.82979E−05 | 1.11490E−04 | −1.76061E−03 | −1.03042E−03 |
| A8 | 2.72836E−06 | −2.44893E−06 | 2.28045E−04 | 1.28958E−04 |
| A10 | 3.08064E−07 | 1.57514E−07 | −2.04527E−06 | −4.78971E−06 |
| A12 | −3.03723E−10 | 6.17613E−10 | −4.36036E−08 | −1.06542E−09 |
| A14 | 1.95134E−09 | 1.68157E−12 | 6.25806E−10 | 6.78167E−10 |
| A16 | 0.00000E+00 | 0.00000E+00 | 0.00000E+00 | 0.00000E+00 |

Figure 6:
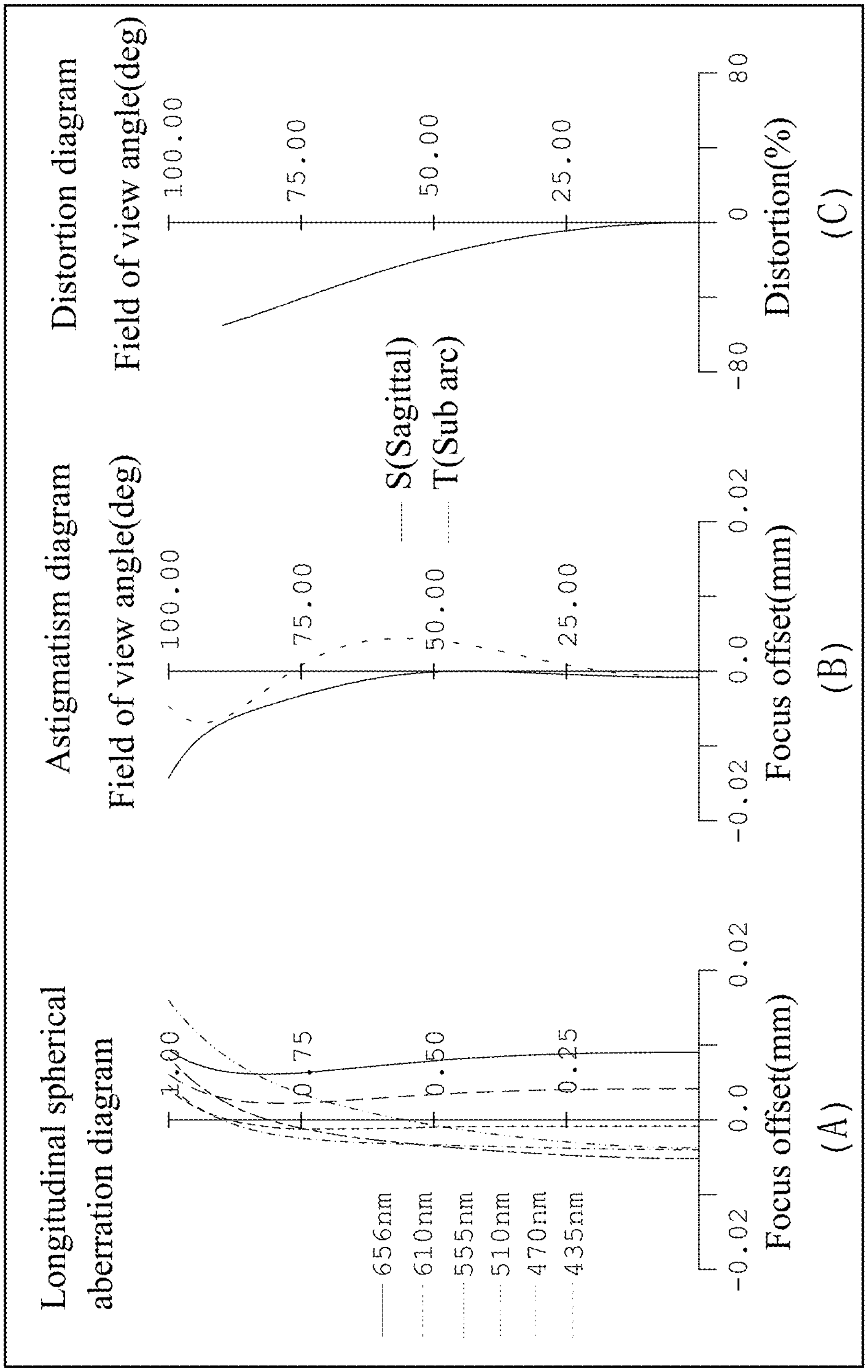
FIG. 6 shows a longitudinal spherical aberration diagram, an astigmatism diagram, and a distortion diagram of the optical lens of the third embodiment of the present application.

Referring to FIG. 6, from the spherical aberration curve of (A) in FIG. 6, the astigmatism curve of (B) in FIG. 6, and the distortion curve of (C) in FIG. 6, it can be seen that the longitudinal spherical aberration, astigmatism, and distortion of the optical lens 100 are well controlled, thus the optical lens 100 of this embodiment has good imaging quality. The wavelengths corresponding to the curves in (A) of FIG. 6, (B) of FIG. 6, and (C) of FIG. 6 can refer to the description of (A) of FIG. 2, (B) of FIG. 2, and (C) of FIG. 2 in the first embodiment, which will not be repeated here.

Fourth Embodiment

Figure 7:
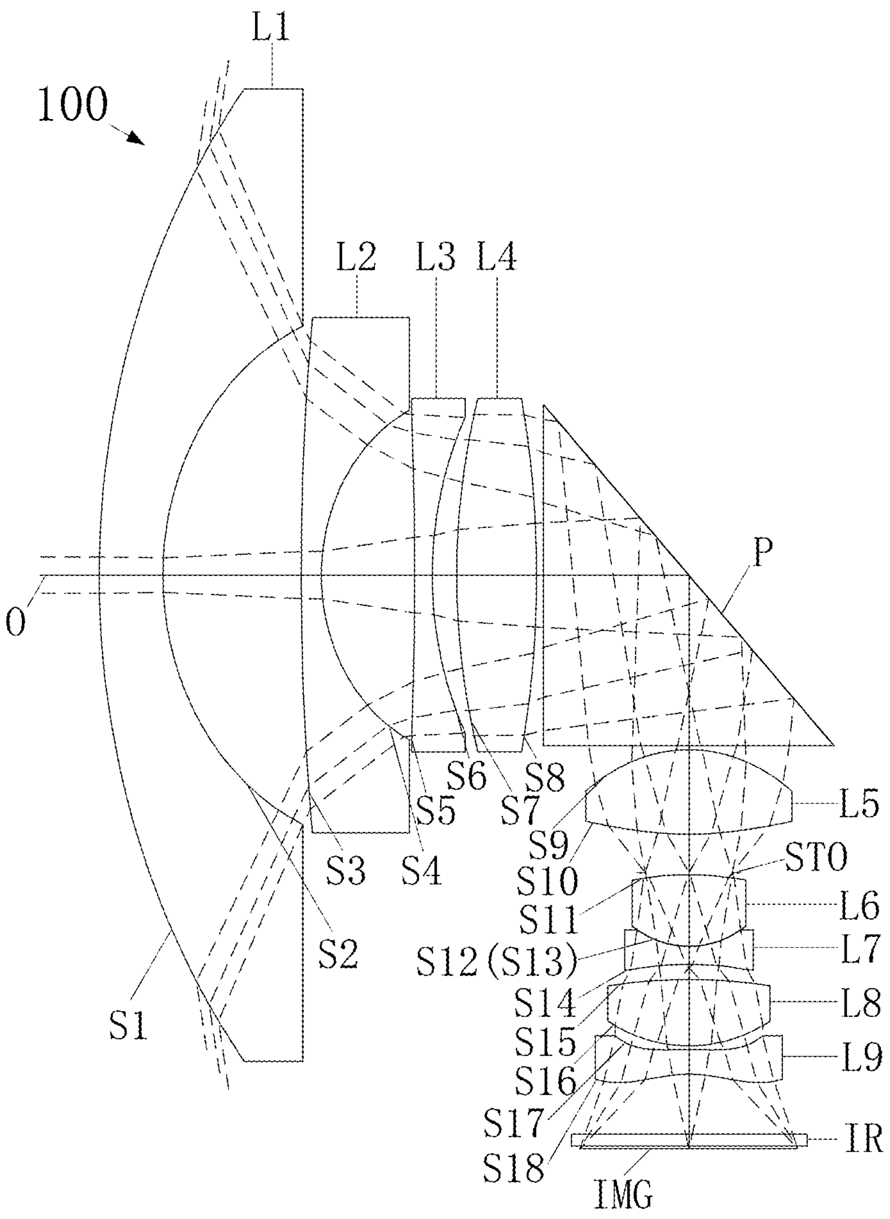
FIG. 7 is a schematic diagram of an optical lens according to a fourth embodiment of the present application.

Referring to FIG. 7, the optical lens 100, from the object side to the image side along the optical axis direction, sequentially includes a first lens L1, a second lens L2, a third lens L3, a fourth lens L4, a prism P, a fifth lens L5, an aperture STO, a sixth lens L6, a seventh lens L7, an eighth lens L8 and a ninth lens L9. The materials of the first lens L1, the second lens L2, the third lens L3, the fourth lens L4, the fifth lens L5, the sixth lens L6, the seventh lens L7, the eighth lens L8, and the ninth lens L9 can be referred to as described in the above embodiments and will not be repeated herein.

The first lens L1 has negative refractive power, the second lens L2 has negative refractive power, the third lens L3 has negative refractive power, the fourth lens L4 has positive refractive power, the fifth lens L5 has positive refractive power, the sixth lens L6 has positive refractive power, the seventh lens L7 has negative refractive power, the eighth lens L8 has positive refractive power, and the ninth lens L9 has negative refractive power.

The object side surface S1 of the first lens L1 is convex near the optical axis O, and the image side surface S2 of the first lens L1 is concave near the optical axis O. The object side surface S3 of the second lens L2 is convex near the optical axis O, and the image side surface S4 of the second lens L2 is concave near the optical axis O. The object side surface S5 of the third lens L3 is concave near the optical axis O, and the image side surface S6 of the third lens L3 is concave near the optical axis O. The object side surface S7 and the image side surface S8 of the fourth lens L4 are both convex near the optical axis O. The object side surface S9 and the image side surface S10 of the fifth lens L5 are both convex near the optical axis O. The object side surface S11 and the image side surface S12 of the sixth lens L6 are both convex near the optical axis O. The object side surface S13 and the image side surface S14 of the seventh lens L7 are both concave near the optical axis O. The object side surface S15 and the image side surface S16 of the eighth lens L8 are both convex near the optical axis O. The object side surface S17 is convex near the optical axis O, and the image side surface S18 of the ninth lens L9 is concave near the optical axis O.

In the fourth embodiment, taking the effective focal length F of the optical lens 100 as 1.8 mm, the aperture number FNO of the optical lens 100 as 2, half of the maximum field of view HFOV of the optical lens 100 as 100 deg, and the total optical length TTL of the optical lens 100 as 31.931 mm as an example.

The other parameters in the third embodiment are given in Table 7 below, and the definitions of each parameter can be obtained from the description of the previous explanation, which will not be repeated here. The units of Y radius, thickness, and effective focal length in Table 7 are mm. The reference wavelength for the effective focal length of each lens in Table 7 is 555 nm, and the reference wavelength for the refractive index and Abbe number of each lens in Table 7 is 587 nm.

TABLE 7

F = 1.8 mm, FNO = 2, HFOV = 100deg, TTL = 31.931 mm

| Surface numeral | Surface name | Surface type | Y radius | Thickness | Material | Refractive index | Abbe number | Effective focal length |
|---|---|---|---|---|---|---|---|---|
| | object surface | sphere | infinity | infinity | | | | |
| 1 | first | sphere | 19.616 | 1.889 | glass | 1.911 | 35.250 | −12.301 |
| 2 | lens L1 | sphere | 6.825 | 4.094 | | | | |
| 3 | second | sphere | 63.223 | 0.600 | glass | 1.729 | 54.669 | −6.830 |
| 4 | lens L2 | sphere | 4.612 | 2.764 | | | | |
| 5 | third | sphere | −93.469 | 0.523 | glass | 1.603 | 60.633 | −12.978 |
| 6 | lens L3 | sphere | 8.589 | 0.724 | | | | |
| 7 | fourth | sphere | 16.081 | 2.368 | glass | 2.001 | 25.460 | 9.574 |
| 8 | lens L4 | sphere | −22.338 | 0.203 | | | | |
| 9 | prism | sphere | infinity | 4.300 | glass | 1.847 | 23.78 | |
| 10 | | sphere | infinity | 4.300 | | | | |
| 11 | | sphere | infinity | 0.100 | | | | |
| 12 | fifth | asphere | 4.817 | 2.131 | glass | 1.847 | 23.780 | 5.764 |
| 13 | lens L5 | asphere | −11.571 | 0.969 | | | | |
| 14 | aperture STO | sphere | infinity | 0.050 | | | | |
| 15 | sixth | sphere | 9.971 | 1.806 | glass | 1.697 | 55.534 | 3.526 |
| 16 | Lens L6 | sphere | −3.031 | 0.000 | | | | |
| 17 | seventh | sphere | −3.031 | 0.452 | glass | 1.923 | 18.900 | −2.508 |
| 18 | lens L7 | sphere | 10.925 | 0.381 | | | | |
| 19 | eighth | sphere | 18.018 | 1.674 | glass | 1.946 | 17.980 | 4.212 |
| 20 | lens L8 | sphere | −4.946 | 0.098 | | | | |
| 21 | ninth | asphere | 23.802 | 0.615 | glass | 1.851 | 40.100 | −6.514 |
| 22 | lens L9 | asphere | 4.460 | 1.545 | | | | |
| 23 | filter IR | sphere | infinity | 0.300 | glass | 1.520 | 64.200 | |
| 24 | | sphere | infinity | 0.045 | | | | |
| | imaging plane IMG | sphere | infinity | 0.000 | | | | |

In the fourth embodiment, Table 8 shows the high-order coefficients that applied for the aspherical surfaces in the fourth embodiment, and the surface type of each aspherical surface can be defined by the formula given in the first embodiment.

TABLE 8

| Surface numeral | 12 | 13 | 21 | 22 |
|---|---|---|---|---|
| k | −2.8809E−01 | −2.2967E+01 | −9.9000E+01 | −3.3681E+00 |
| A4 | −5.8003E−05 | −5.2060E−04 | −2.2746E−02 | −1.7314E−02 |
| A6 | −1.2284E−05 | 6.7722E−05 | 1.3139E−03 | 1.8940E−03 |
| A8 | 2.2688E−06 | −3.9566E−06 | −1.2582E−04 | −1.7570E−04 |
| A10 | −1.4421E−07 | 8.9255E−08 | 1.1155E−06 | 6.4377E−06 |
| A12 | 1.9294E−16 | 2.0268E−16 | 1.2573E−14 | 1.1639E−14 |
| A14 | 5.0120E−18 | −7.2599E−17 | 6.5233E−15 | 2.6126E−15 |
| A16 | 6.1034E−19 | 3.8173E−18 | 1.5891E−15 | −1.1476E−16 |

Figure 8:
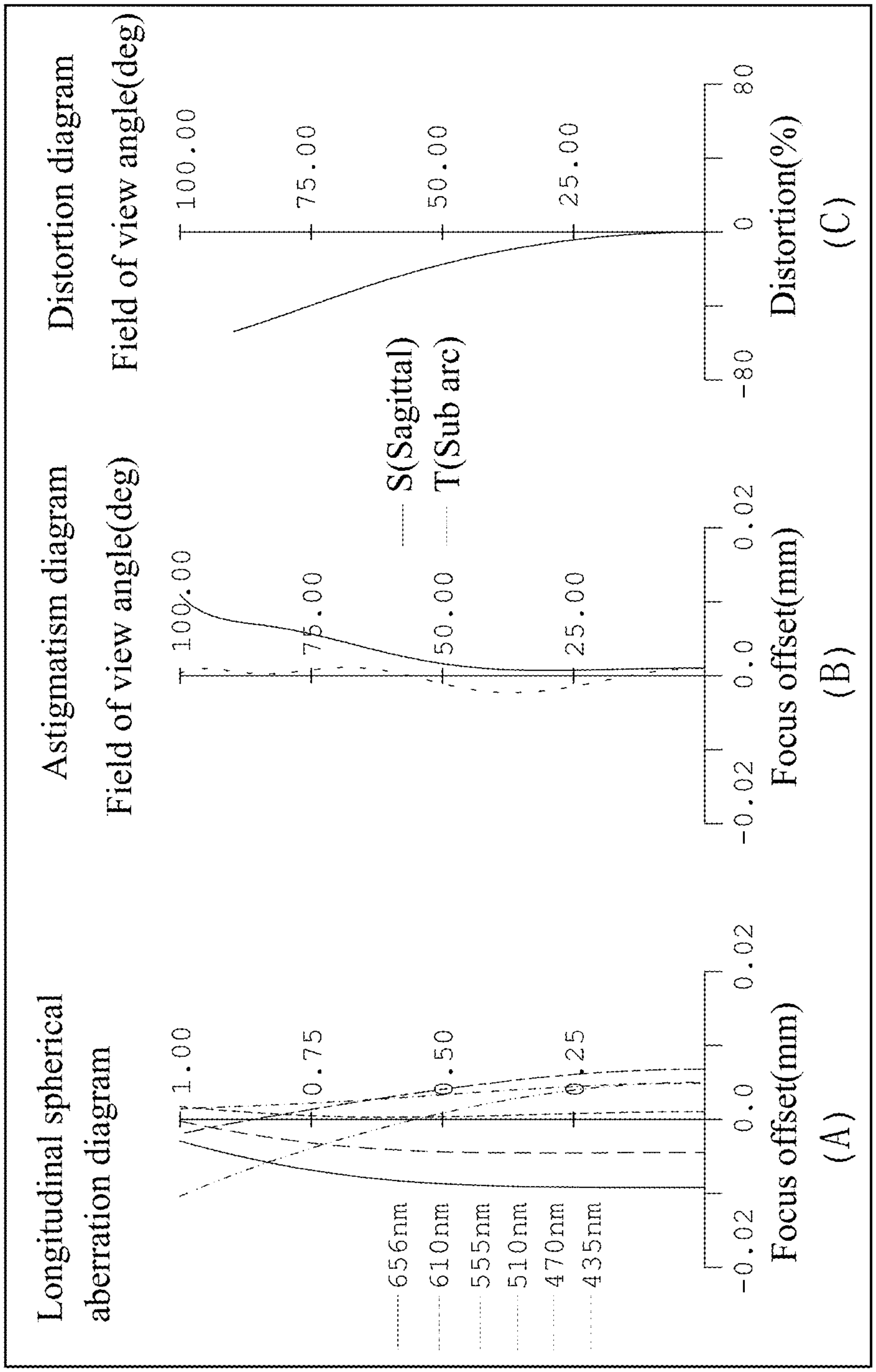
FIG. 8 shows a longitudinal spherical aberration diagram, an astigmatism diagram, and a distortion diagram of the optical lens of the fourth embodiment of the present application.

Referring to FIG. 8, from the spherical aberration curve of (A) in FIG. 8, the astigmatism curve of (B) in FIG. 8, and the distortion curve of (C) in FIG. 8, it can be seen that the longitudinal spherical aberration, astigmatism, and distortion of the optical lens 100 are well controlled, thus the optical lens 100 of this embodiment has good imaging quality. The wavelengths corresponding to the curves in (A) of FIG. 8, (B) of FIG. 8, and (C) of FIG. 8 can refer to the description of (A) of FIG. 2, (B) of FIG. 2, and (C) of FIG. 2 in the first embodiment, which will not be repeated here.

Fifth Embodiment

Figure 9:
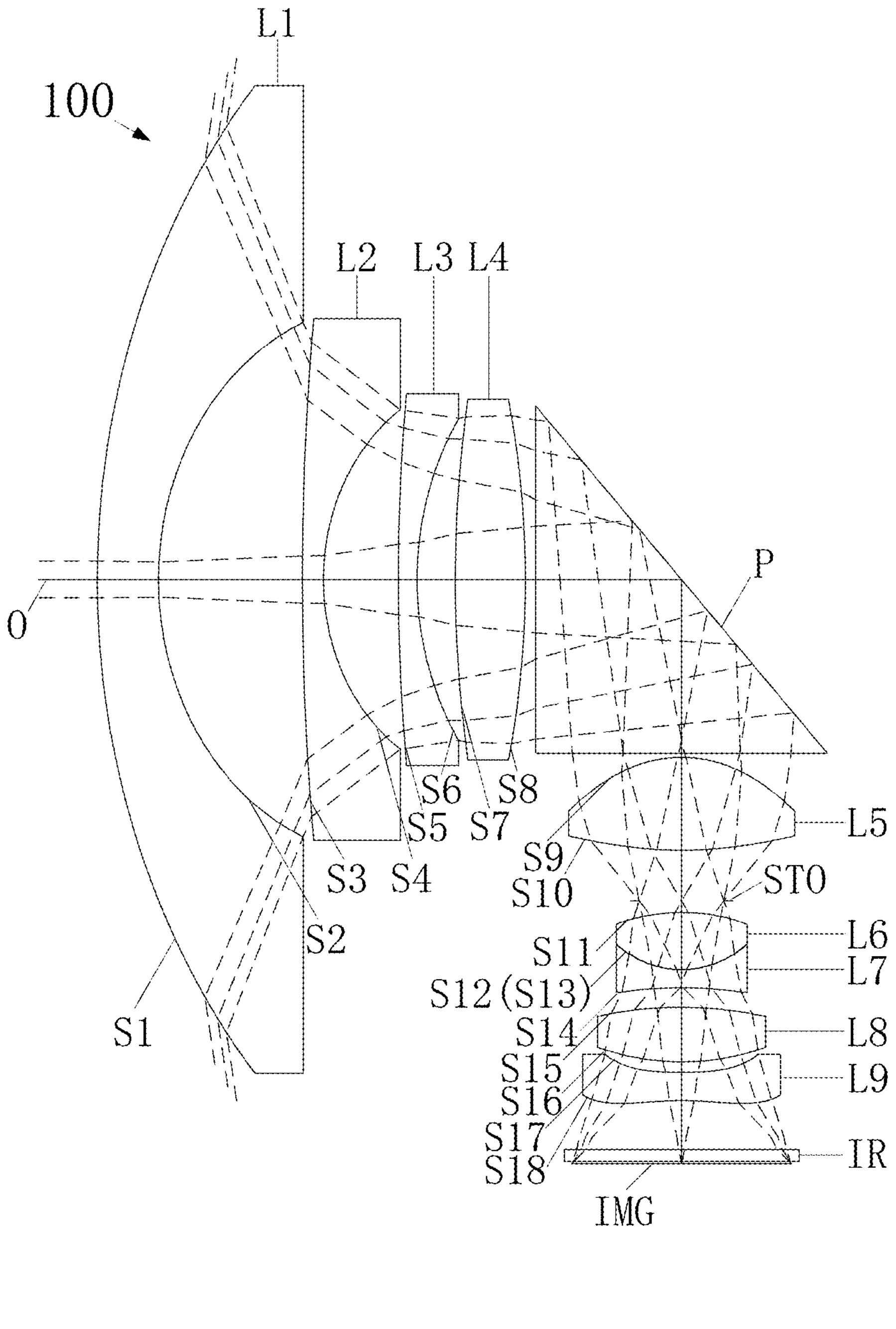
FIG. 9 is a schematic diagram of an optical lens according to a fifth embodiment of the present application.

Referring to FIG. 9, the optical lens 100, from the object side to the image side along the optical axis direction, sequentially includes a first lens L1, a second lens L2, a third lens L3, a fourth lens L4, a prism P, a fifth lens L5, a aperture STO, a sixth lens L6, a seventh lens L7, an eighth lens L8 and a ninth lens L9. The materials of the first lens L1, the second lens L2, the third lens L3, the fourth lens L4, the fifth lens L5, the sixth lens L6, the seventh lens L7, the eighth lens L8, and the ninth lens L9 can be referred to as described in the above embodiments and will not be repeated herein.

The first lens L1 has negative refractive power, the second lens L2 has negative refractive power, the third lens L3 has negative refractive power, the fourth lens L4 has positive refractive power, the fifth lens L5 has positive refractive power, the sixth lens L6 has positive refractive power, the seventh lens L7 has negative refractive power, the eighth lens L8 has positive refractive power, and the ninth lens L9 has negative refractive power.

The object side surface S1 of the first lens L1 is convex near the optical axis O, and the image side surface S2 of the first lens L1 is concave near the optical axis O. The object side surface S3 of the second lens L2 is convex near the optical axis O, and the image side surface S4 of the second lens L2 is concave near the optical axis O. The object side surface S5 of the third lens L3 is concave near the optical axis O, and the image side surface S6 of the third lens L3 is concave near the optical axis O. The object side surface S7 and the image side surface S8 of the fourth lens L4 are both convex near the optical axis O. The object side surface S9 and the image side surface S10 of the fifth lens L5 are both convex near the optical axis O. The object side surface S11 and the image side surface S12 of the sixth lens L6 are both convex near the optical axis O. The object side surface S13 and the image side surface S14 of the seventh lens L7 are both concave near the optical axis O. The object side surface S15 and the image side surface S16 of the eighth lens L8 are both convex near the optical axis O. The object side surface S17 is convex near the optical axis O, and the image side surface S18 of the ninth lens L9 is concave near the optical axis O.

In the fifth embodiment, taking the effective focal length F of the optical lens 100 as 1.851 mm, the aperture number FNO of the optical lens 100 as 2.03, half of the maximum field of view HFOV of the optical lens 100 as 100 deg, and the total optical length TTL of the optical lens 100 as 31.65 mm as an example.

The other parameters in the third embodiment are given in Table 9 below, and the definitions of each parameter can be obtained from the description of the previous explanation, which will not be repeated here. The units of Y radius, thickness, and effective focal length in Table 9 are mm. The reference wavelength for the effective focal length of each lens in Table 9 is 555 nm, and the reference wavelength for the refractive index and Abbe number of each lens in Table 9 is 587 nm.

TABLE 9

| F = 1.851 mm, FNO = 2.03, HFOV = 100deg, TTL = 31.65 mm | | | | | | | | |
|---|---|---|---|---|---|---|---|---|
| Surface numeral | Surface name | Surface type | Y radius | Thickness | Material | Refractive index | Abbe number | Effective focal length |
| | object surface | sphere | infinity | infinity | | | | |
| 1 | first | sphere | 18.433 | 1.800 | glass | 1.911 | 35.250 | −12.972 |
| 2 | lens L1 | sphere | 6.885 | 4.235 | | | | |
| 3 | second | sphere | 63.000 | 0.620 | glass | 1.835 | 42.720 | −6.555 |
| 4 | lens L2 | sphere | 5.032 | 2.206 | | | | |
| 5 | third | sphere | 43.947 | 0.550 | glass | 1.589 | 61.248 | −14.372 |
| 6 | lens L3 | sphere | 7.084 | 1.126 | | | | |
| 7 | fourth | sphere | 26.800 | 2.063 | glass | 2.001 | 25.460 | 10.698 |
| 8 | lens L4 | sphere | −20.235 | 0.300 | | | | |
| 9 | prism | sphere | infinity | 4.300 | glass | 1.847 | 23.78 | |
| 10 | | sphere | infinity | 4.300 | | | | |
| 11 | | sphere | infinity | 0.100 | | | | |
| 12 | fifth | asphere | 4.441 | 2.301 | glass | 1.619 | 63.855 | 5.626 |
| 13 | lens L5 | asphere | −13.086 | 1.257 | | | | |
| 14 | aperture STO | sphere | 无限 | 0.282 | | | | |
| 15 | sixth | sphere | 6.571 | 1.413 | glass | 1.593 | 68.620 | 3.881 |
| 16 | Lens L6 | sphere | −3.270 | 0.000 | | | | |
| 17 | seventh | sphere | −3.270 | 0.450 | glass | 1.923 | 18.900 | −2.829 |
| 18 | lens L7 | sphere | 14.494 | 0.481 | | | | |
| 19 | eighth | sphere | 13.254 | 1.351 | glass | 1.946 | 17.980 | 5.679 |
| 20 | lens L8 | sphere | −8.728 | 0.260 | | | | |
| 21 | ninth | asphere | −18.062 | 0.700 | glass | 1.851 | 40.100 | −7.544 |
| 22 | lens L9 | asphere | 10.215 | 1.210 | | | | |
| 23 | filter IR | sphere | infinity | 0.300 | glass | 1.520 | 64.200 | |
| 24 | | sphere | infinity | 0.045 | | | | |
| | imaging plane IMG | sphere | infinity | 0.000 | | | | |

In the fifth embodiment, Table 10 shows the high-order coefficients that applied for the aspherical surfaces in the fourth embodiment, and the surface type of each aspherical surface can be defined by the formula given in the first embodiment.

TABLE 10

| Surface numeral | 12 | 13 | 21 | 22 |
|---|---|---|---|---|
| k | 1.89960E−01 | −1.73580E+00 | −1.56059E+02 | 9.20104E+00 |
| A4 | 7.71730E−04 | −1.03753E−03 | 1.64940E−02 | 1.11118E−02 |
| A6 | 6.42263E−05 | 7.97318E−05 | −9.92510E−04 | −5.96808E−04 |
| A8 | −9.23756E−07 | −4.26255E−06 | 5.69596E−05 | 4.84126E−05 |
| A10 | 4.68245E−07 | 1.71492E−07 | 2.99977E−06 | 7.99523E−07 |
| A12 | 1.37029E−14 | 6.02226E−09 | 2.66818E−07 | −2.20914E−08 |

TABLE 10-continued

| Surface numeral | 12 | 13 | 21 | 22 |
|---|---|---|---|---|
| A14 | 1.57846E−11 | −8.53271E−10 | −4.22088E−08 | 2.56182E−09 |
| A16 | 0.00000E+00 | 0.00000E+00 | 0.00000E+00 | 0.00000E+00 |

Figure 10:
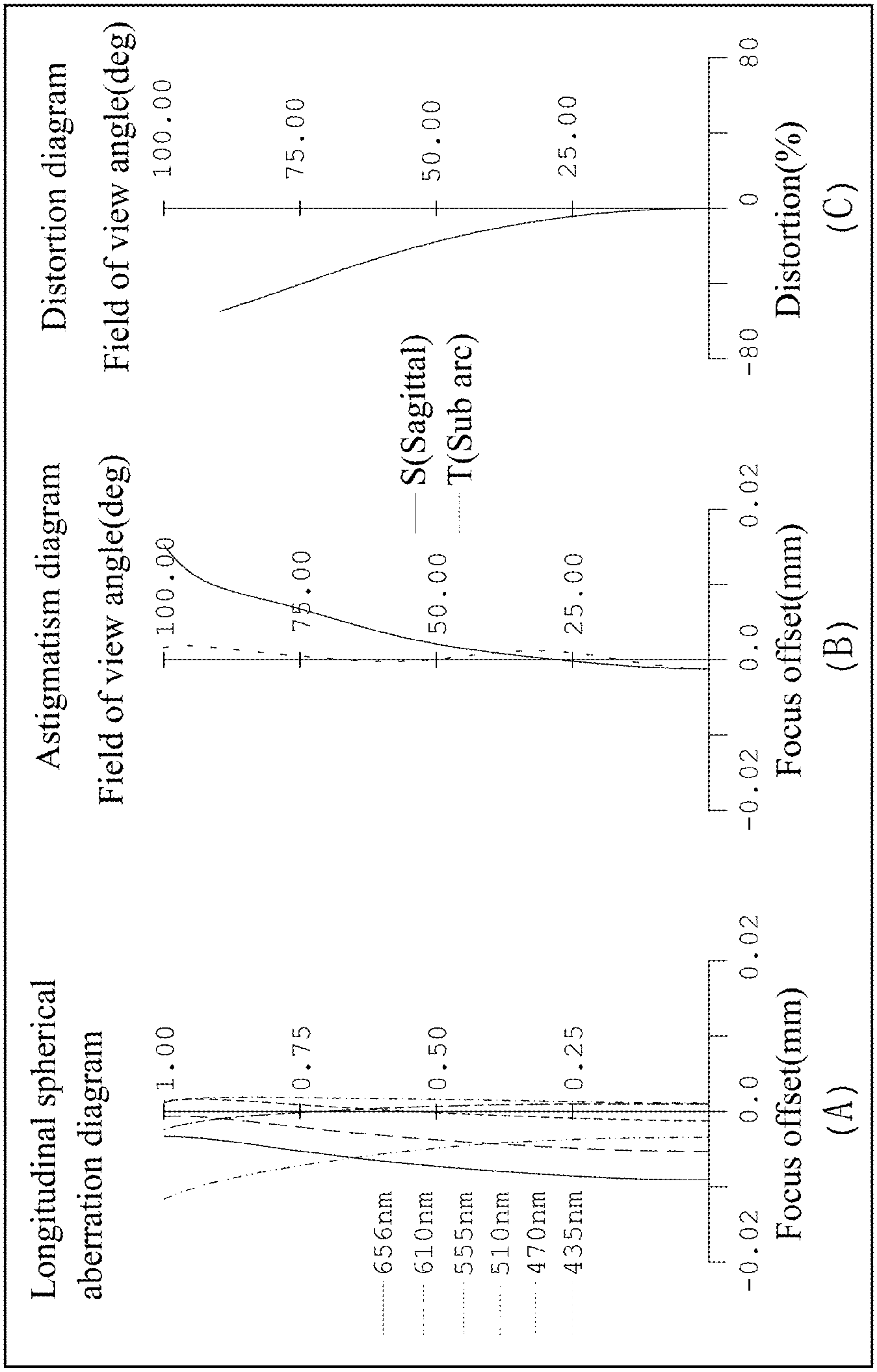
FIG. 10 shows a longitudinal spherical aberration diagram, an astigmatism diagram, and a distortion diagram of the optical lens of the fifth embodiment of the present application.

Referring to FIG. 10, from the spherical aberration curve of (A) in FIG. 10, the astigmatism curve of (B) in FIG. 10, and the distortion curve of (C) in FIG. 10, it can be seen that the longitudinal spherical aberration, astigmatism, and distortion of the optical lens 100 are well controlled, thus the optical lens 100 of this embodiment has good imaging quality. The wavelengths corresponding to the curves in (A) of FIG. 10, (B) of FIG. 10, and (C) of FIG. 10 can refer to the description of (A) of FIG. 2, (B) of FIG. 2, and (C) of FIG. 2 in the first embodiment, which will not be repeated here.

Referring to FIG. 10, Table 11 is a summary of the ratio of each relationship formula in the first embodiment to the fifth embodiment of the present application.

TABLE 11

| Relationship formula | Embodiment First embodiment | Second embodiment | Third embodiment | Fourth embodiment | Fifth embodiment |
|---|---|---|---|---|---|
| 16.5 < TTL/F < 18 | 16.9393 | 17.1232 | 17.0673 | 17.7394 | 17.0989 |
| 0.6 < (SD11 − SD10)/CT56 < 1.2 | 0.6223 | 1.1112 | 1.1491 | 1.0481 | 0.8096 |
| 2 < BFL/(IMGH − SD18) < 3 | 2.4345 | 2.4860 | 2.3276 | 2.6676 | 2.6650 |
| 0.9 < ATL/BTL < 1.3 | 1.2548 | 1.2095 | 1.1943 | 1.2073 | 1.1903 |
| 1 mm < SAG1 + SD1/TAN (HFOV) < 2 mm | 1.7001 | 1.3462 | 1.8803 | 1.5998 | 1.8720 |
| −9 mm < N3*F3 + N4*F4 − CT34 < −2 mm | −6.7549 | −4.0623 | −8.5981 | −2.3702 | −2.5564 |
| 30 < VD6 − VD7 < 60 | 58.8440 | 49.7200 | 52.7320 | 36.6340 | 49.7200 |
| −4 < F1234/F < −2 | −2.8393 | −3.0328 | −2.8879 | −3.5300 | −2.9173 |
| −8 < F1/F < −6 | −7.3568 | −6.7677 | −6.8891 | −6.8339 | −7.0081 |
| −4 < F2/F < −3 | −3.4530 | −3.6575 | −3.5961 | −3.7944 | −3.5413 |
| −12 < F3/F < −7 | −11.4428 | −9.5413 | −11.5283 | −7.2100 | −7.7645 |
| 5 < F4/F < 8 | 7.6749 | 6.8320 | 7.7824 | 5.3189 | 5.7796 |
| 2.5 < F5/F < 3.5 | 2.9984 | 3.0124 | 2.9365 | 3.2022 | 3.0394 |
| 1.5 < F6/F < 2.5 | 2.4793 | 2.3717 | 2.0048 | 1.9589 | 2.0967 |
| −2 < F7/F < −1 | −1.6873 | −1.6272 | −1.3759 | −1.3933 | −1.5284 |
| 2 < F8/F < 4 | 3.5024 | 3.1286 | 2.9074 | 2.3400 | 3.0681 |
| −6 < F9/F < −3 | −5.2096 | −4.4592 | −3.9461 | −3.6189 | −4.0756 |
| 1 $mm^{-1}$ < R14/R15/CT78 < 2 $mm^{-1}$ | 1.9354 | 1.5170 | 1.1311 | 1.5914 | 2.2735 |
| 1 < (R11 + \|R12\| + R14)/(R11 + R12 + R14) < 2 | 1.3480 | 1.6794 | 1.5460 | 1.3393 | 1.3675 |
| −1 < F1/R1 < −0.5 | −0.7002 | −0.5895 | −0.6161 | −0.6271 | −0.7037 |
| −2.5 < F1/R2 < −1.5 | −2.0220 | −1.8550 | −1.8833 | −1.8023 | −1.8841 |
| F2/R3 < −0.2 | −0.0974 | −0.0521 | −0.0540 | −0.1080 | −0.1040 |
| −1.5 < F2/R4 < −1 | −1.2956 | −1.2475 | −1.2496 | −1.4809 | −1.3027 |
| \|F3/R5\| < 2 | 1.7964 | 0.8464 | 1.3184 | 0.1388 | 0.3270 |
| −4 < F3/R6 < −1 | −3.8690 | −2.5536 | −3.0392 | −1.5110 | −2.0288 |
| 0.3 < F4/R7 < 0.7 | 0.6450 | 0.3984 | 0.3973 | 0.5954 | 0.3992 |
| −0.8 < F4/R8 < −0.4 | −0.5590 | −0.6169 | −0.7992 | −0.4286 | −0.5287 |
| 1.1 < F5/R9 < 1.3 | 1.2394 | 1.2088 | 1.2934 | 1.1966 | 1.2668 |
| −0.6 < F5/R10 < −0.4 | −0.4435 | −0.5036 | −0.4172 | −0.4981 | −0.4299 |
| 0.3 < F6/R11 < 0.8 | 0.7022 | 0.6875 | 0.6521 | 0.3536 | 0.5906 |
| −1.5 < F6/R12 < −1 | −1.4110 | −1.0829 | −1.2816 | −1.1633 | −1.1869 |
| 0.6 < F7/R13 < 1 | 0.9602 | 0.7430 | 0.8795 | 0.8274 | 0.8651 |
| −0.4 < F7/R14 < −0.1 | −0.2027 | −0.3137 | −0.3260 | −0.2296 | −0.1952 |
| 0.2 < F8/R15 < 0.5 | 0.4918 | 0.4135 | 0.3701 | 0.2338 | 0.4285 |
| −1 < F8/R16 < −0.5 | −0.7468 | −0.6639 | −0.7370 | −0.8516 | −0.6507 |
| 0.2 < \|F9/R17\| < 0.6 | 0.5368 | 0.2345 | 0.5988 | 0.2737 | 0.4177 |
| −6 < F9/R18 < −3 | −0.9491 | −0.9256 | −0.5554 | −1.4605 | −0.7385 |
| 1.9 < FNO < 2.1 | 2.03 | 2.03 | 2 | 2 | 2.03 |

Figure 11:
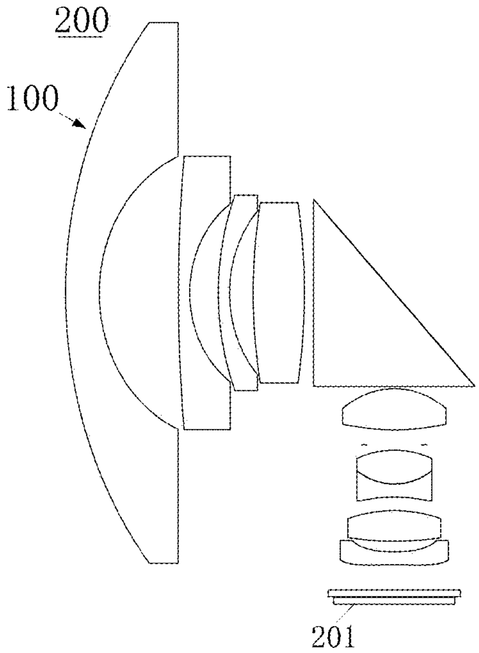
FIG. 11 is a schematic diagram of a camera module according to an embodiment of the present application.

Referring to FIG. 11, in a second aspect, the present application further discloses a camera module 200, the camera module 200 includes an image sensor 201 and an optical lens 100 as described in any one of the first embodiment to the fifth embodiment, and the image sensor 201 is disposed on the image side of the optical lens 100. The optical lens 100 can be used to receive light signals from the subject and project the light signals onto the image sensor 201, and the image sensor 201 can convert the light signals corresponding to the subject into image signals, which will not be repeated here. The camera module 200 with the optical lens 100 mentioned above has all the technical effects of the optical lens 100, and the optical lens 100 of the terminal device can achieve excellent imaging quality while meeting the requirements of miniaturized design.

Figure 12:
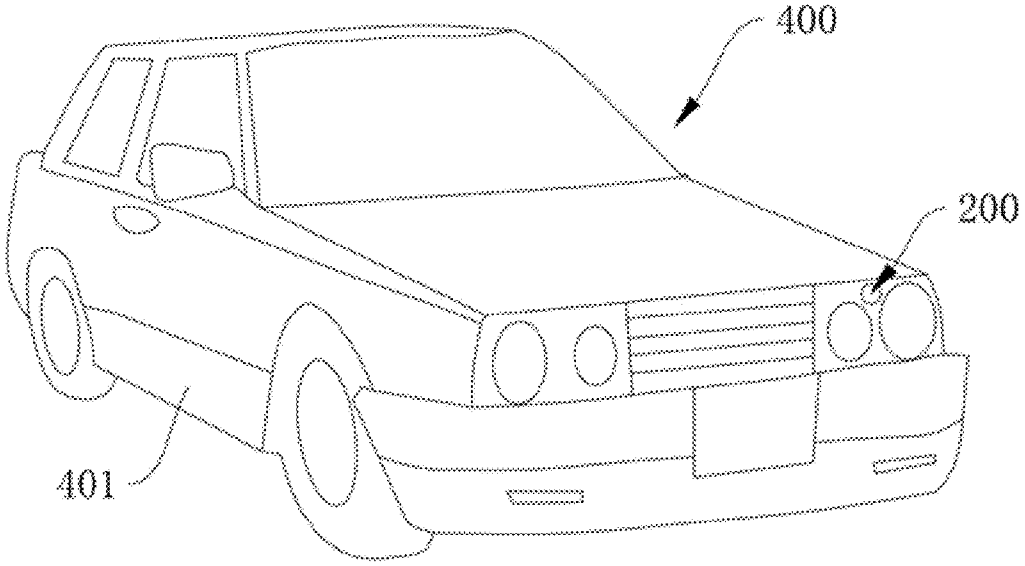
FIG. 12 is a schematic diagram of a terminal device according to an embodiment of the present application.

Referring to FIG. 12, in a third aspect, the present application further discloses a terminal device 400, the terminal device 400 includes a fixing member 401 and a camera module 200 as described in the second aspect, and the camera module 200 is disposed on the fixing member 401. The terminal device 400 can include but is not limited to mobile phones, tablets, laptops, smart watches, monitors, dash cams, rearview cameras, etc. The terminal device 400 with the camera module 200 mentioned above has all the technical effects of the camera module 200, and the optical lens 100 of the terminal device can achieve excellent imaging quality while meeting the requirements of miniaturized design.

The above embodiments are only for describing but not intended to limit the present disclosure. Although the embodiments of the present disclosure have been described, those having ordinary skill in the art can understand that changes may be made within the principles of the present disclosure, up to and including the full extent established by the broad general meaning of the terms used in the claims. It will, therefore, be appreciated that the embodiments described above may be modified within the scope of the claims.

What is claimed is:

1. An optical lens comprising a first lens, a second lens, a third lens, a fourth lens, a fifth lens, a sixth lens, a seventh lens, an eighth lens, and a ninth lens disposed in sequence along an optical axis from an object side to an image side;

the first lens having negative refractive power, an object side surface of the first lens being convex near the optical axis, and an image side surface of the first lens being concave near the optical axis;

the second lens having negative refractive power, an object side surface of the second lens being convex near the optical axis, and an image side surface of the second lens being concave near the optical axis;

the third lens having negative refractive power, and an image side surface of the third lens being concave near the optical axis;

the fourth lens having positive refractive power, an object side surface of the fourth lens being convex near the optical axis, and an image side surface of the fourth lens being convex near the optical axis;

the fifth lens having positive refractive power, an object side surface of the fifth lens being convex near the optical axis, and an image side surface of the fifth lens being concave near the optical axis;

the sixth lens having positive refractive power, an object side surface of the sixth lens being convex near the optical axis, and an image side surface of the sixth lens being convex near the optical axis;

the seventh lens having negative refractive power, an object side surface of the seventh lens being concave near the optical axis, and an image side surface of the seventh lens being concave near the optical axis;

the eighth lens having positive refractive power, an object side surface of the eighth lens being convex near the optical axis, and an image side surface of the eighth lens being convex near the optical axis; and the ninth lens having negative refractive power, and an image side surface of the ninth lens being concave near the optical axis;

wherein lenses with refractive power are nine lenses;

wherein the optical lens satisfies following relationships:

$16.5<TTL/F<18$;

wherein TTL is a distance from the object side surface of the first lens to an imaging plane of the optical lens along the optical axis, and F is an effective focal length of the optical lens.

2. The optical lens according to claim 1, wherein the optical lens further satisfies following relationships:

$$0.6<(SD11-SD10)/CT56<1.2;$$

wherein SD10 is half of maximum effective aperture of the image side surface of the fifth lens, and SD11 is half of the maximum effective aperture of the object side surface of the sixth lens, CT56 is a distance from the image side surface of the fifth lens to the object side surface of the sixth lens along the optical axis.

3. The optical lens according to claim 1, wherein the optical lens further satisfies following relationships:

$$2<BFL/(IMGH-SD18)<3;$$

wherein CT56 is a distance from the image side surface of the ninth lens to the imaging plane of the optical lens along the optical axis, IMGH is half of an image height corresponding to a maximum field of view angle of the optical lens, and SD18 is half of maximum effective aperture of the image side surface of the ninth lens.

4. The optical lens according to claim 1, wherein the optical lens further comprises a prism, the optical lens further satisfies following relationships:

$$0.9<ATL/BTL<1.3;$$

wherein ATL is a distance from the object side surface of the first lens to a reflective surface of the prism along the optical axis, BTL is a distance from the reflective surface of the prism to a imaging plane of the optical lens.

5. The optical lens according to claim 1, wherein the optical lens further satisfies following relationships:

$$1\text{ mm}<SAG1+SD1/\text{TAN}(HFOV)<2\text{ mm};$$

wherein SAG1 is a vector height of the object side of the first lens at a maximum effective aperture, SD1 is half of the maximum effective aperture of the object side of the first lens, and HFOV is half of the maximum field of view angle of the optical lens.

6. The optical lens according to claim 1, wherein the optical lens further satisfies following relationships:

$$-9\text{ mm}<N3*F3+N4*F4-CT34<-2\text{ mm};\ \text{and/or}$$

$$30<VD6-VD7<60;$$

wherein N3 is a refractive index of the third lens, N4 is a refractive index of the fourth lens, F3 is an effective focal length of the third lens, F4 is an effective focal length of the fourth lens, CT34 is a distance from the image side surface of the third lens to the object side surface of the fourth lens along the optical axis, VD6 is a Abbe number of the sixth lens, and VD7 is a Abbe number of the seventh lens.

7. The optical lens according to claim 1, wherein the optical lens further satisfies following relationships:

$$-4 < F1234/F < -2;\ \text{and/or}$$

$$-8 < F1/F < -6;\ \text{and/or}$$

$$-12 < F3/F < -7;\ \text{and/or}$$

$$-6 < F9/F < -3;$$

wherein F1234 is a combined effective focal length of the first lens, the second lens, the third lens, and the fourth lens, F1 is an effective focal length of the first lens, F3 is an effective focal length of the third lens, and F9 is an effective focal length of the ninth lens.

8. The optical lens according to claim 1, wherein the optical lens further satisfies following relationships:

$$1\ \text{mm}^{-1} < R14/R15/CT78 < 2\ \text{mm}^{-1};\ \text{and/or}$$

$$1 < (R11 + |R12| + R14)/(R11 + R12 + R14) < 2;\ \text{and/or}$$

$$6 < F9/R18 < -3;$$

wherein R11 is a curvature radius of the object side surface of the sixth lens at the optical axis, R12 is a curvature radius of the image side surface of the sixth lens along the optical axis, R14 is a curvature radius of the image side surface of the seventh lens along the optical axis, R15 is a curvature radius of the object side surface of the eighth lens along the optical axis, R18 is a curvature radius of the image side surface of the ninth lens along the optical axis, CT78 is a distance from the image side surface of the seventh lens to the object side surface of the eighth lens along the optical axis, and F9 is an effective focal length of the ninth lens.

9. A camera module comprising:

the optical lens according to claim 1; and an image sensor located on the image side of the optical lens.

10. The camera module according to claim 9, wherein the optical lens further satisfies following relationships:

$$0.6 < (SD11 - SD10)/CT56 < 1.2;$$

wherein SD10 is half of maximum effective aperture of the image side surface of the fifth lens, and SD11 is half of the maximum effective aperture of the object side surface of the sixth lens, CT56 is a distance from the image side surface of the fifth lens to the object side surface of the sixth lens along the optical axis.

11. The camera module according to claim 9, wherein the optical lens further satisfies following relationships:

$$2 < BFL/(IMGH - SD18) < 3;$$

wherein CT56 is a distance from the image side surface of the ninth lens to the imaging plane of the optical lens along the optical axis, IMGH is half of an image height corresponding to a maximum field of view angle of the optical lens, and SD18 is half of maximum effective aperture of the image side surface of the ninth lens.

12. The camera module according to claim 9, wherein the optical lens further comprises a prism, the optical lens further satisfies following relationships:

$$0.9 < ATL/BTL < 1.3;$$

wherein ATL is a distance from the object side surface of the first lens to a reflective surface of the prism along the optical axis, BTL is a distance from the reflective surface of the prism to a imaging plane of the optical lens.

13. The camera module according to claim 9, wherein the optical lens further satisfies following relationships:

$$1\ \text{mm} < SAG1 + SD1/\text{TAN}\,(HFOV) < 2\ \text{mm};$$

wherein SAG1 is a vector height of the object side of the first lens at a maximum effective aperture, SD1 is half of the maximum effective aperture of the object side of the first lens, and HFOV is half of the maximum field of view angle of the optical lens.

14. The camera module according to claim 1, wherein the optical lens further satisfies following relationships:

$$-9\ \text{mm} < N3 * F3 + N4 * F4 - CT34 < -2\ \text{mm};\ \text{and/or}$$

$$30 < VD6 - VD7 < 60;$$

wherein N3 is a refractive index of the third lens, N4 is a refractive index of the fourth lens, F3 is an effective focal length of the third lens, F4 is an effective focal length of the fourth lens, CT34 is a distance from the image side surface of the third lens to the object side surface of the fourth lens along the optical axis, VD6 is a Abbe number of the sixth lens, and VD7 is a Abbe number of the seventh lens.

15. The camera module according to claim 9, wherein the optical lens further satisfies following relationships:

$$-4 < F1234/F < -2;\ \text{and/or}$$

$$-8 < F1/F < -6;\ \text{and/or}$$

$$-12 < F3/F < -7;\ \text{and/or}$$

$$-6 < F9/F < -3;$$

wherein F1234 is a combined effective focal length of the first lens, the second lens, the third lens, and the fourth lens, F1 is an effective focal length of the first lens, F3 is an effective focal length of the third lens, and F9 is an effective focal length of the ninth lens.

16. The camera module according to claim 9, wherein the optical lens further satisfies following relationships:

$$1\ \mathrm{mm}^{-1} < R14/R15/CT78 < 2\ \mathrm{mm}^{-1};\ \text{and/or}$$

$$1 < (R11 + |R12| + R14)/(R11 + R12 + R14) < 2;\ \text{and/or}$$

$$6 < F9/R18 <-3;$$

wherein R11 is a curvature radius of the object side surface of the sixth lens at the optical axis, R12 is a curvature radius of the image side surface of the sixth lens along the optical axis, R14 is a curvature radius of the image side surface of the seventh lens along the optical axis, R15 is a curvature radius of the object side surface of the eighth lens along the optical axis, R18 is a curvature radius of the image side surface of the ninth lens along the optical axis, CT78 is a distance from the image side surface of the seventh lens to the object side surface of the eighth lens along the optical axis, and F9 is an effective focal length of the ninth lens.

17. A terminal device comprising:

a fixing member; and the camera module according to claim 9, and the camera module located in the fixing member.

18. The terminal device according to claim 17, wherein the optical lens further satisfies following relationships:

$$0.6 < (SD11 - SD10)/CT56 < 1.2;$$

wherein SD10 is half of maximum effective aperture of the image side surface of the fifth lens, and SD11 is half of the maximum effective aperture of the object side surface of the sixth lens, CT56 is a distance from the image side surface of the fifth lens to the object side surface of the sixth lens along the optical axis.

19. The terminal device according to claim 17, wherein the optical lens further satisfies following relationships:

$$2 < BFL/(IMGH - SD18) < 3;$$

wherein CT56 is a distance from the image side surface of the ninth lens to the imaging plane of the optical lens along the optical axis, IMGH is half of an image height corresponding to a maximum field of view angle of the optical lens, and SD18 is half of maximum effective aperture of the image side surface of the ninth lens.

20. The terminal device according to claim 17, wherein the optical lens further comprises a prism, the optical lens further satisfies following relationships:

$$0.9 < ATL/BTL < 1.3;$$

wherein ATL is a distance from the object side surface of the first lens to a reflective surface of the prism along the optical axis, BTL is a distance from the reflective surface of the prism to a imaging plane of the optical lens.

* * * * *